(12) United States Patent
Miracle et al.

(10) Patent No.: US 9,752,104 B2
(45) Date of Patent: *Sep. 5, 2017

(54) THIOPHENE AZO CARBOXYLATE DYES AND LAUNDRY CARE COMPOSITIONS CONTAINING THE SAME

(71) Applicant: The Procter & Gamble Company, Cincinnati, OH (US)

(72) Inventors: Gregory Scot Miracle, Liberty Township, OH (US); Eduardo Torres, Boiling Springs, SC (US); John David Bruhnke, Spartanburg, SC (US); Sanjeev Kumar Dey, Spartanburg, SC (US)

(73) Assignee: The Procter & Gamble Company, Cincinnati, OH (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/507,860

(22) Filed: Oct. 7, 2014

(65) Prior Publication Data
US 2015/0031591 A1    Jan. 29, 2015

Related U.S. Application Data

(63) Continuation of application No. 13/478,148, filed on May 23, 2012, now Pat. No. 8,888,865.

(60) Provisional application No. 61/492,928, filed on Jun. 3, 2011.

(51) Int. Cl.
| | |
|---|---|
| *C11D 3/42* | (2006.01) |
| *C11D 3/40* | (2006.01) |
| *C09B 29/033* | (2006.01) |
| *C09B 29/08* | (2006.01) |
| *C09B 69/10* | (2006.01) |

(52) U.S. Cl.
CPC ............ *C11D 3/42* (2013.01); *C09B 29/0059* (2013.01); *C09B 29/0813* (2013.01); *C09B 29/0816* (2013.01); *C09B 69/106* (2013.01); *C11D 3/40* (2013.01)

(58) Field of Classification Search
None
See application file for complete search history.

(56) References Cited

U.S. PATENT DOCUMENTS

| | | | |
|---|---|---|---|
| 4,593,088 A | 6/1986 | Gourley | |
| 5,176,745 A | 1/1993 | Moore et al. | |
| 5,310,887 A | 5/1994 | Moore et al. | |
| 5,782,934 A | 7/1998 | Hall et al. | |
| 6,548,649 B2 | 4/2003 | Mikoshiba et al. | |
| 7,205,269 B2 | 4/2007 | Sadlowski | |
| 7,642,282 B2 | 1/2010 | Valenti | |
| 8,022,100 B2 | 9/2011 | Valenti | |
| 8,138,222 B2 | 3/2012 | Valenti | |
| 8,247,364 B2 | 8/2012 | Sadlowski et al. | |
| 8,268,016 B2 | 9/2012 | Batchelor | |
| 8,888,865 B2 | 11/2014 | Miracle et al. | |
| 2008/0096789 A1 | 4/2008 | Batchelor | |
| 2008/0177089 A1 | 7/2008 | Sadlowski | |
| 2008/0235884 A1 | 10/2008 | Sadlowski | |
| 2009/0286709 A1 | 11/2009 | Sadlowski | |
| 2009/0312220 A1 | 12/2009 | Boutoille | |
| 2010/0115707 A1 | 5/2010 | Batchelor | |
| 2012/0117736 A1 | 5/2012 | Miracle | |
| 2012/0123101 A1 | 5/2012 | Torres et al. | |
| 2012/0178665 A1 | 7/2012 | Valenti | |
| 2012/0277139 A1 | 11/2012 | Sadlowski | |
| 2012/0304398 A1 | 12/2012 | Miracle | |
| 2012/0304402 A1 | 12/2012 | Miracle | |
| 2012/0309945 A1 | 12/2012 | Torres et al. | |
| 2013/0245242 A1 | 9/2013 | Torres et al. | |

FOREIGN PATENT DOCUMENTS

| | | |
|---|---|---|
| GB | 1425029 | 12/1973 |
| JP | 2007/099825 | 4/2007 |
| WO | WO 2008/087497 A1 | 7/2008 |
| WO | WO 2011/011799 A2 | 1/2011 |
| WO | WO 2011/017719 A2 | 2/2011 |

OTHER PUBLICATIONS

Vicente Del Amo, Adam p. McGlone, Clive Foster and Anthony P Davis, A Blue Dye for Substrate Tagging in the Two-Color Screening of Combinatorial Libraries, Journal of Combinational Chemistry, 2005, pp. 1-3, vol. 7(1);American Chemical Society, Bristol UK.
D.W. Rangnekar, Synthesis of navel thieno[2,3-b]thiophene bisazo disperse dyes, Journal of Indian Council of Chemists, 2000, pp. 11-14, vol. 17(1), Indian Council of Chemists, Mumbai, India (abstract).
International Search Report dated Oct. 18, 2012, containing 8 pages.

*Primary Examiner* — Kamal Saeed
(74) *Attorney, Agent, or Firm* — John T. Dipre; Steven W. Miller

(57) ABSTRACT

This application relates to thiophene azo carboxylate dyes for use as hueing agents, laundry care compositions comprising such dyes that may serve as hueing agents, processes for making such dyes and laundry care compositions and methods of using the same. The aforementioned dyes contain a formally charged moiety and are generally comprised of at least two components: at least one chromophore component and at least one polymeric component. Suitable chromophore components generally fluoresce blue, red, violet, or purple color when exposed to ultraviolet light, or they may absorb light to reflect these same shades. Such dyes are advantageous in providing a hueing effect, for example, a whitening effect to fabrics, while not building up over time and causing undesirable blue discoloration to the treated fabrics. Such dyes are also generally stable to bleaching agents used in laundry care compositions.

20 Claims, No Drawings

THIOPHENE AZO CARBOXYLATE DYES AND LAUNDRY CARE COMPOSITIONS CONTAINING THE SAME

TECHNICAL FIELD

This application relates to thiophene azo carboxylate dyes for use as hueing agents, laundry care compositions comprising such dyes, processes for making such dyes and laundry care compositions and methods of using the same. The aforementioned dyes contain a formally charged moiety and are generally comprised of at least two components: at least one chromophore component and at least one polymeric component. Suitable chromophore components generally fluoresce blue, red, violet, or purple color when exposed to ultraviolet light, or they may absorb light to reflect these same shades. These dyes are advantageous in providing a hueing effect, for example, a whitening effect to fabrics, while not building up over time and causing undesirable discoloration to the treated fabrics. Such dyes are also generally stable to bleaching agents used in laundry care compositions.

BACKGROUND

As textile substrates age, their color tends to fade or yellow due to exposure to light, air, soil, and natural degradation of the fibers that comprise the substrates. Thus, the purpose of hueing agents is generally to visually brighten these textile substrates and counteract the fading and yellowing of the substrates. Typically, hueing agents may be found in laundry detergents, fabric softeners, or rinse aids and are therefore applied to textile substrates during the laundering process. However, it is important that hueing agents function to visually brighten treated textile substrates without causing undesirable staining of the textile substrates. Cellulosic substrates, in particular, tend to exhibit a yellow hue after exposure to light, air, and/or soiling. This yellowness is often difficult to reverse by normal laundering procedures. As a result, there exists a need for improved hueing agents which are capable of eliminating the yellowness exhibited by ageing cellulosic substrates. By utilizing such improved hueing agents, the life of the textile substrates, such as clothing articles, table linens, etc., may be extended. Unfortunately, current thiophene azo dyes, are not as physically stable as desired. Thus, they require special solvents/handling which can limit liquid dye product and laundry care composition formulation flexibility. In addition, current thiophene azo carboxylate dyes disclosed for use in laundry compositions, either do not provide the desired hueing benefit at the levels that can be used in products, are too costly and/or they build up to an undesirable level, thus overhueing the treated situs over multiple treatment cycles.

The thiophene azo carboxylate dyes disclosed herein and the laundry care compositions comprising same offer advantages over previous efforts in this area, as, unlike previous thiophene azo hueing agents, the present thiophene azo carboxylate dyes comprise a formally charged carboxylate moiety (above its pKa) that allows such dyes to provide enhanced deposition, removal and hue angle, without the negatives of pretreat spot staining on polyurea fibers such as Lycra® and/or excessive cost. While not being bound by theory, Applicants believe that such negatives are avoided as the instant thiophene azo carboxylate dyes interacts with metal ions, for example, in the wash water in a more favorable manner. The aforementioned benefits are offered over a range of fabric types. In short, Applicants recognized the source of the current hueing deficiencies and herein provide the solution to such problem. The hueing compounds disclosed herein also absorb light at a wavelength appropriate to visually neutralize the yellowness of substrates, including textile substrates. These compounds function ideally as hueing agents for substrates, including textile substrates, and may be incorporated into laundry care compositions for use by consumers.

SUMMARY OF INVENTION

This application relates to thiophene azo carboxylate dyes for use as hueing agents, laundry care compositions comprising such dyes that may serve as hueing agents, processes for making such dyes and laundry care compositions and methods of using the same. The aforementioned dyes contain a formally charged moiety and are generally comprised of at least two components: at least one chromophore component and at least one polymeric component. Suitable chromophore components generally fluoresce blue, red, violet, or purple color when exposed to ultraviolet light, or they may absorb light to reflect these same shades. Such dyes are advantageous in providing a hueing effect, for example, a whitening effect to fabrics, while not building up over time and causing undesirable blue discoloration to the treated fabrics. Such dyes are also generally stable to bleaching agents used in laundry care compositions.

DETAILED DESCRIPTION

As used herein, the term "alkoxy" is intended to include $C_1$-$C_8$ alkoxy and alkoxy derivatives of polyols having repeating units such as butylene oxide, glycidol oxide, ethylene oxide or propylene oxide.

As used herein, the terms "alkyl" and "alkyl capped" are intended to include $C_1$-$C_{18}$ alkyl groups, and in one aspect, $C_1$-$C_6$ alkyl groups.

As used herein, the term "aryl" is intended to include $C_3$-$C_{12}$ aryl groups.

As used herein, the term "arylalkyl" is intended to include $C_1$-$C_{18}$ alkyl groups and, in one aspect, $C_1$-$C_6$ alkyl groups.

As used herein, the term "formally charged moiety" means a moiety having at least one formal positive charge or at least one formal negative charge in aqueous solution at a pH in the range from 7 to 11.

The terms "ethylene oxide," "propylene oxide" and "butylene oxide" may be shown herein by their typical designation of "EO," "PO" and "BO," respectively.

As used herein, the term "laundry care composition" includes, unless otherwise indicated, granular, powder, liquid, gel, paste, unit dose bar form and/or flake type washing agents and/or fabric treatment compositions.

As used herein, the term "fabric treatment composition" includes, unless otherwise indicated, fabric softening compositions, fabric enhancing compositions, fabric freshening compositions and combinations there of. Such compositions may be, but need not be rinse added compositions.

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, the articles including "the", "a" and "an" when used in a claim, are understood to mean one or more of what is claimed or described.

As used herein, the terms "include", "includes" and "including" are meant to be non-limiting.

As used herein, the term "maximum extinction coefficient" is intended to describe the molar extinction coefficient at the maximum wavelength in the range of 400 nanometers to 750 nanometers.

As a consequence of their manufacturing process, the thiophene azo carboxylate dyes disclosed herein may contain a distribution of repeating units in their polymeric moiety. Accordingly, in one aspect, the molecular weight of the thiophene azo carboxylate dyes disclosed herein may be reported as an average molecular weight, as determined by its molecular weight distribution.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention.

Laundry Care Composition Comprising Suitable Hueing Agents

In one aspect, a laundry care composition comprising a hueing agent and one or more laundry care ingredients is disclosed. Suitable hueing agents include all the hueing agents listed below.

In one aspect, a composition comprising a thiophene azo carboxylate dye containing a carboxylic acid moiety, with the proviso that the thiophene azo carboxylate dye does not have the following structures

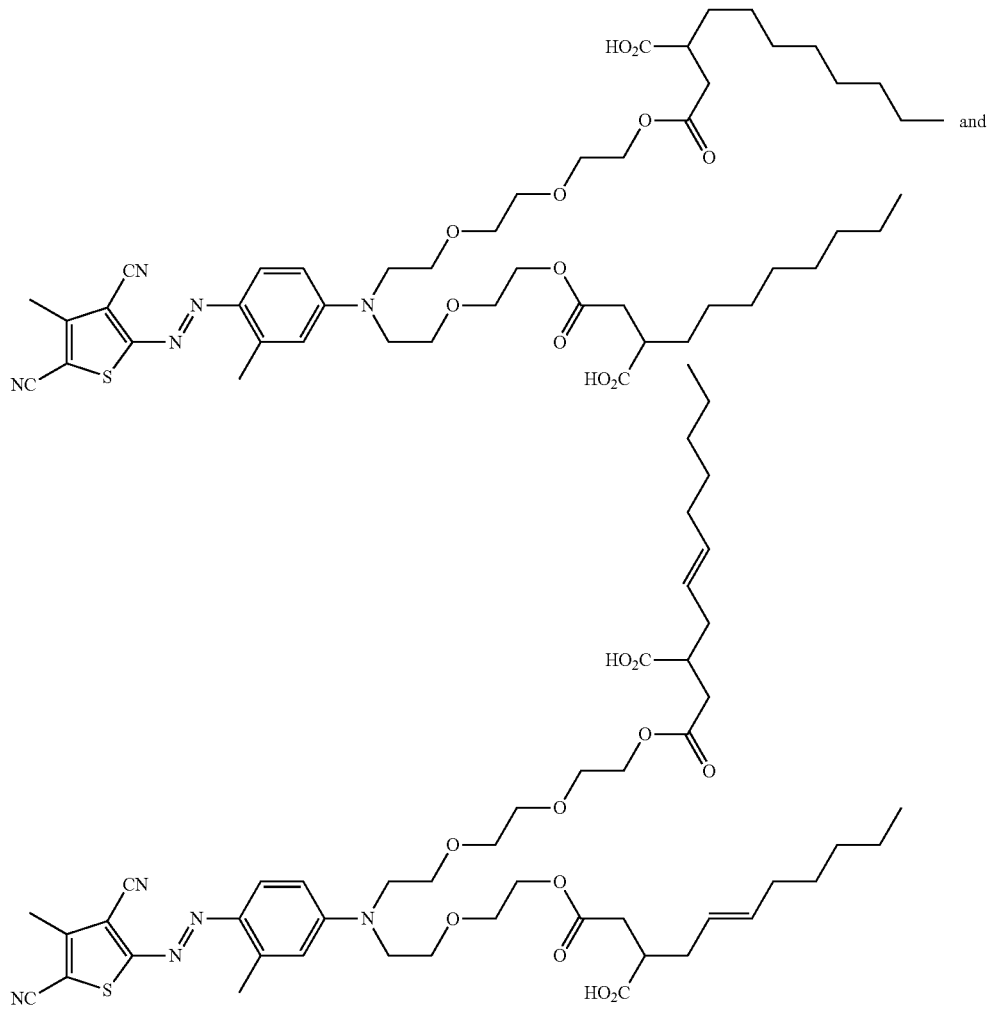

is disclosed.

b) a laundry care ingredient.

In one aspect of the laundry care composition, said thiophene azo carboxylate dye has, in the wavelength range of about 400 nm to about 750 nm in methanol solution, a maximum extinction coefficient greater than about 1000 liter/mol/cm.

In one aspect of the aforementioned laundry care composition, said thiophene azo carboxylate dye has, in the wavelength range of about 540 nm to about 630 nm, a maximum extinction coefficient from about 20,000 to about 100,000 liter/mol/cm.

In one aspect of the aforementioned laundry care composition, said thiophene azo carboxylate dye has, in the wavelength range of about 560 nm to about 610 nm, a maximum extinction coefficient from about 20,000 to about 65,000 liter/mol/cm.

In one aspect of the aforementioned laundry care composition, said thiophene azo carboxylate dye has a molecular weight from greater than 232 Daltons, from about 233 Daltons to about 5000 Daltons, from about 365 Daltons to about 2500 Daltons, or even from about 423 Daltons to about 1000 Daltons.

In one aspect of the aforementioned laundry care composition, said thiophene azo carboxylate dye is represented by general Formula (I):

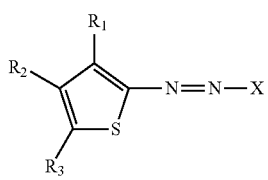

Formula I wherein:
a.) $R_1$, $R_2$ and $R_3$ are each independently selected from hydrogen, electron-withdrawing moieties, and electron-donating moieties, provided that at least one of $R_1$, $R_2$ and $R_3$ is an electron-withdrawing moiety; and
b.) wherein X is an organic moiety having a molecular weight from about 104 Daltons to about 4871 Daltons, from about 236 Daltons to about 2371 Daltons from about 294 Daltons to about 871 Daltons.

In one aspect of the aforementioned laundry care composition, for said thiophene azo carboxylate dye having Formula I, each $R_1$, $R_2$ and $R_3$ is independently selected from hydrogen, ($C_1$-$C_4$)-alkyl, ($C_3$-$C_{10}$)-aryl, carboxylate, cyano, sulfonate, phosphonate, sulfate, acetate, nitro, ($C_1$-$C_4$)-alkyl ester, halogen or amino moiety.

In one aspect of the aforementioned laundry care composition, for said thiophene azo carboxylate dye having Formula I, X is a moiety having Formula (II) below:

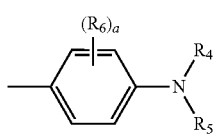

Formula II wherein:
i.) $R_4$ is selected from a moiety having Formula (III) below

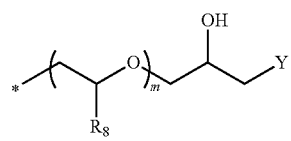

Formula III wherein:
each $R_8$ is independently selected from hydrogen, $C_1$-$C_8$ alkyl optionally substituted with a hydroxy, or acetyl;
m is an integer from 0 to 10;
Y is —OC(O)GCO$_2$M wherein M is H or a charge balancing cation; G is an organic group derived from a substituted or unsubstituted succinic, maleic, glutaric, adipic or phthalic anhydride having Formula IV,

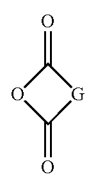

Formula IV said anhydride having a molecular weight less than about 353 Daltons, from about 98 Daltons to 352 Daltons, or even from about 100 Daltons to about 325 Daltons;
ii) $R_4$ is selected from a moiety having Formula (V) below:

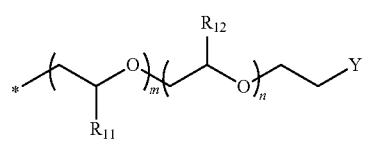

Formula V wherein
each $R_{11}$ and $R_{12}$ is independently selected from hydrogen, $C_1$-$C_8$ alkyl, aryl, acetyl or hydroxyl moiety; m and n are independent and are integers from 0 to 10,
Y is —OC(O)GCO$_2$M wherein M is H or a charge balancing cation; G is an organic group derived from a substituted or unsubstituted succinic, maleic, glutaric, adipic or phthalic anhydride having Formula VI,

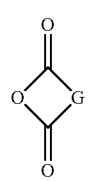

Formula IV said anhydride having a molecular weight less than about 353 Daltons, from about 98 Daltons to 352 Daltons, or even from about 100 Daltons to about 325 Daltons; or iii.) $R_4$ is selected from a moiety having Formula (VII) below:

Formula VII

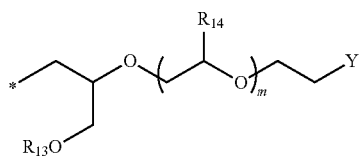

wherein
$R_{13}$ is selected from a $C_6$-$C_{10}$ aryl moiety, $C_7$-$C_{12}$ arylalkyl moiety, $C_1$-$C_{18}$ alkyl moiety, or a siloxane moiety;
each $R_{14}$ is independently selected from hydrogen, $C_1$-$C_4$ alkyl; m is an integer from 0 to 10;
Y is —OC(O)GCO$_2$M wherein M is H or a charge balancing cation; G is an organic group derived from a substituted or unsubstituted succinic, maleic, glutaric, adipic or phthalic anhydride having Formula VIII, Formula VIII

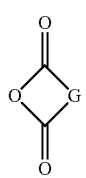

said anhydride having a molecular weight less than about 353 Daltons, from about 98 Daltons to 352 Daltons, or even from about 100 Daltons to about 325 Daltons;
$R_5$ is an independently selected $R_4$ moiety as defined above or $R_5$ is selected from $C_1$-$C_{12}$ alkyl moiety, a $C_2$-$C_{12}$ ether moiety; $C_6$-$C_{10}$ aryl moiety or $C_7$-$C_{12}$ arylalkyl moiety; wherein the index a is an integer from 0 to 4, and each $R_6$ may be independently selected from a $C_1$-$C_6$ alkyl, a $C_1$-$C_4$ alkoxy, a nitro, a hydroxyl, a halogen, or —NHC(O)$R_{22}$ wherein $R_{22}$ is selected from H, —NH$_2$, $C_1$-$C_6$ alkyl, phenyl, —(CH$_2$)$_s$OR$_{23}$ where the index s is 1 or 2 and $R_{23}$ is selected from Me, phenyl, and —CO$_2$CH$_2$CN; —NHSO$_2$R$_{24}$ wherein $R_{24}$ is $C_1$-$C_4$ alkyl or phenyl; said alkyl, alkoxy and acetamido moieties may be optionally substituted with a carboxylate moiety;
or, X is a moiety having Formula II above:
wherein each R4 and R5 can independently be selected from:
a) [(CH$_2$CR'HO)$_x$(CH$_2$CR''HO)$_y$R$_{15}$];
b) $C_1$-$C_{12}$ alkyl, $C_6$-$C_{10}$ aryl or $C_7$-$C_{12}$ aryl alkyl;
c) [CH$_2$CH(OR$_{16}$)CH$_2$OR$_{17}$];
d) the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units wherein at least one such alkyleneoxide unit is substituted with $R_{15}$ that is not —H; wherein R' is selected from the group consisting of H, CH$_3$, CH$_2$O(CH$_2$CH$_2$O)$_z$R$_{15}$, and mixtures thereof; R'' is selected from the group consisting of H, CH$_2$O(CH$_2$CH$_2$O)$_z$R$_{15}$, and mixtures thereof; x+y≤20; y≥1; z=0 to 10; each $R_{15}$ is independently selected from —H and Y wherein Y is —OC(O)GCO$_2$M wherein M is H or a charge balancing cation; G is an organic group derived from a substituted or unsubstituted succinic, maleic, glutaric, adipic or phthalic anhydride having Formula IX, Formula IX

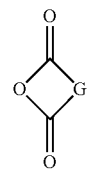

said anhydride having a molecular weight less than about 353 Daltons, from about 98 Daltons to 352 Daltons, or even from about 100 Daltons to about 325 Daltons;
$R_{16}$ is selected from the group consisting of H, (CH$_2$CH$_2$O)$_z$R$_{15}$ wherein z=0 to 10, and mixtures thereof; $R_{17}$ is selected from the group consisting of $C_1$-$C_{16}$ alkyl, $C_6$-$C_{10}$ aryl groups, and mixtures thereof; the index m is an integer from 0 to 4 and each $R_6$ is as defined above; further provided the molecule contains at least one non-H $R_{15}$ group.

In one aspect of the aforementioned laundry care composition, for said thiophene azo carboxylate dye having Formula I X is a moiety having Formula (II) below:

Formula II

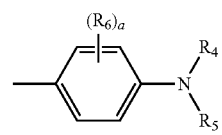

wherein:
i.) $R_4$ is selected from a moiety having Formula (III) below

Formula III

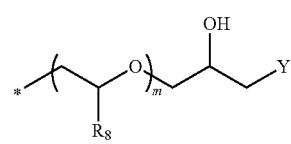

wherein:
$R_8$ is a hydrogen, $C_1$-$C_4$ alkyl moiety or an $C_6$-$C_{10}$ aryl moiety;
Y is —OC(O)GCO$_2$M wherein M is H or a charge balancing cation; G is an organic group derived from a substituted or unsubstituted succinic, maleic, glutaric, adipic or phthalic anhydride having Formula IV, Formula IV

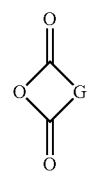

said anhydride having a molecular weight less than about 353 Daltons, from about 98 Daltons to 352 Daltons, or even from about 100 Daltons to about 325 Daltons;

or, $R_4$ is selected from a moiety having Formula (V) below:

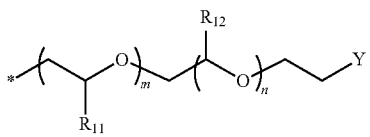

Formula V wherein
  each $R_{11}$ and $R_{12}$ is independently selected from hydrogen, $C_1$-$C_4$ alkyl or $C_6$-$C_{10}$ aryl moiety; m and n are independent and are integers from 0 to 5,
  Y is —OC(O)GCO$_2$M wherein M is H or a charge balancing cation; G is an organic group derived from a substituted or unsubstituted succinic, maleic, glutaric, adipic or phthalic anhydride having Formula VI,

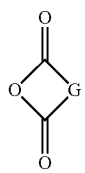

Formula VI said anhydride having a molecular weight less than about 353 Daltons, from about 98 Daltons to 352 Daltons, or even from about 100 Daltons to about 325 Daltons;
or, $R_4$ is selected from a moiety having Formula (VII) below:

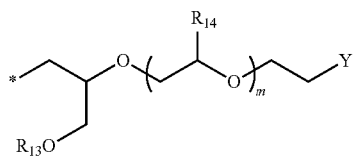

Formula VII wherein
  $R_{13}$ is selected from an $C_6$-$C_{10}$ aryl moiety, benzyl moiety, or a $C_1$-$C_{18}$ alkyl moiety;
  each $R_{14}$ is independently selected from hydrogen or —CH$_3$;
  m is an integer from 0 to 10,
  Y is —OC(O)GCO$_2$M wherein M is H or a charge balancing cation; G is an organic group derived from a substituted or unsubstituted succinic, maleic, glutaric, adipic or phthalic anhydride having Formula VIII,

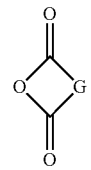

Formula VIII said anhydride having a molecular weight less than about 353 Daltons, from about 98 Daltons to 352 Daltons, or even from about 100 Daltons to about 325 Daltons;
ii.) $R_5$ is an independently selected $R_4$ moiety as defined above or $R_5$ is $R_5$ selected from $C_1$-$C_6$ alkyl moiety or benzyl moiety;
iii.) wherein the index a is an integer from 0 to 2, and each $R_6$ may be independently selected from methyl, methoxy, or acetamido moiety.

In one aspect of the aforementioned laundry care composition, for said thiophene azo carboxylate dye having Formula I, each $R_1$, $R_2$ and $R_3$ is independently selected from hydrogen, ($C_1$-$C_4$)-alkyl, ($C_6$-$C_{10}$)-aryl, carboxylate, cyano, sulfonate, acetate, nitro, ($C_1$-$C_4$)-alkyl ester, halogen or amino moiety, in one aspect, each $R_1$, $R_2$ and $R_3$ is independently selected from hydrogen, ($C_1$-$C_4$)-alkyl, carboxylate, cyano, sulfonate, nitro, ($C_1$-$C_4$)-alkyl ester or halogen moiety.

In one aspect of the aforementioned laundry care composition, said thiophene azo carboxylate dye has Formula (X):

A-N=N—X  Formula X wherein the A moiety is selected from the group consisting of Table 1 A Moieties Nos. 1-118 and wherein X is selected from the group consisting of Table 4 X Moieties Nos. 1-24 wherein G is an organic group derived from a substituted or unsubstituted succinic, maleic, glutaric, adipic or phthalic anhydride having Formula XI,

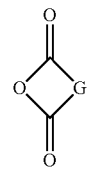

Formula XI said anhydride having a molecular weight less than about 353 Daltons, from about 98 Daltons to 352 Daltons, or even from about 100 Daltons to about 325 Daltons.

In one aspect of the aforementioned laundry care composition, said thiophene azo carboxylate dye has Formula (XII):

A-N=N—X  Formula XII wherein the A moiety is selected from the group consisting of Table 1 A Moieties Nos. 9-11, 15, 23, 34-35, 37-39, 41, 43, 47, 50-51, 57-58, 77, 83, 89, 95, 106, and 110-118; and wherein the X moiety is selected from the group consisting of Table 4 X Moieties Nos. 1-8, 13, 14, and 18-21, wherein G is an organic group derived from a substituted or unsubstituted succinic, maleic, glutaric, adipic or phthalic anhydride having Formula XIII, Formula XIII

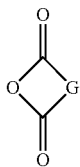

said anhydride having a molecular weight less than about 353 Daltons, from about 98 Daltons to 352 Daltons, or even from about 100 Daltons to about 325 Daltons. In one aspect of the aforementioned laundry care composition, said G moiety of said thiophene azo carboxylate dye is selected from Table 5 G Moieties Nos. 1-48.

In one aspect of the aforementioned laundry care composition, said thiophene azo carboxylate dye has the following formula:

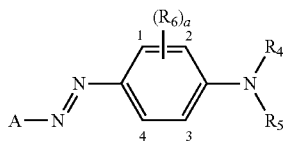

wherein the moiety A is selected from Table 1 A Moieties Nos. 1-118; a=0 to 2; when a=1 or 2, $R_6$ is selected from Table 2 $R_6$ Substituent Identity and Position Nos. 1-40; and $R_4$ and $R_5$ grouping is selected from Table 3 $R_4$ and $R_5$ Groupings Nos. 1-83.

In one aspect of the aforementioned laundry care composition, said thiophene azo carboxylate dye has the following formula:

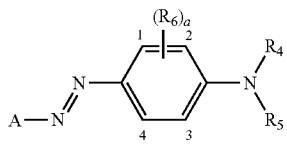

wherein the moiety A is selected from Table 1 A Moieties Nos. 9-11, 15, 23, 34-35, 37-39, 41, 43, 47, 50-51, 57-58, 77, 83, 89, 95, 106, and 110-118; a=0 to 2; when a=1 or 2, $R_6$ is selected from Table 2 $R_6$ Substituent Identity and Position Nos. 1, 3, 5, 7, 12, 13, 14, 31, 36 and 40; and $R_4$ and $R_5$ grouping is selected from Table 3 $R_4$ and $R_5$ Groupings Nos. 3-8, 14, 15, 18-23, 29, 30, 33-38, 44, 45, 48-53, 59, 60, 63-66, 71-76, 82 and 83.

In one aspect of the aforementioned laundry care composition, said thiophene azo carboxylate dye has a formula selected from Table 6 Formula Nos. 1-48, in one aspect, said thiophene azo carboxylate dye has a formula selected from Table 6 Formula Nos. 1-36, 43 and 44.

A moieties may be selected from the moieties shown in Table 1:

TABLE 1

| No. | A |
|---|---|
| 1 | ![structure with C(=O)NH2 on tetrahydrobenzothiophene] |
| 2 | ![structure with C(=O)OMe on cycloheptathiophene] |
| 3 | ![structure with CN on cycloheptathiophene] |
| 4 | ![structure with C(=O)OMe on tetrahydrobenzothiophene] |
| 5 | ![structure with C(=O)OMe on cyclopentathiophene] |
| 6 | ![structure with C(=O)OEt, methyl, and acetyl on thiophene] |
| 7 | ![structure with C(=O)OMe, methyl, and acetyl on thiophene] |
| 8 | ![structure with CN, methyl, and acetyl on thiophene] |

TABLE 1-continued

A Moieties

| No. | A |
|---|---|
| 9 | 3-methyl-2,4-bis(ethoxycarbonyl)thiophene (CO₂Et and EtO₂C substituents) |
| 10 | 3-methyl-2,4-bis(methoxycarbonyl/ethoxycarbonyl)thiophene |
| 11 | 3-methyl-4-cyano-2-(ethoxycarbonyl)thiophene |
| 12 | 3-phenyl-5-(methoxycarbonyl)thiophene |
| 13 | 3-phenyl-5-(ethoxycarbonyl)thiophene |
| 14 | 3-(ethoxycarbonyl)benzo[b]thiophene |
| 15 | 3,5-dinitrothiophene |
| 16 | 4-ethyl-5-(2-chlorobenzoyl)thiophene |
| 17 | 3-cyano-4,5,6,7-tetrahydrobenzo[b]thiophene |
| 18 | 3-(ethoxycarbonyl)-4,5,6,7-tetrahydrobenzo[b]thiophene |
| 19 | 3,4-bis(ethoxycarbonyl)thiophene |
| 20 | 3-cyano-8-oxo-8H-indeno[2,1-b]thiophene |
| 21 | 3-nitro-5-sulfothiophene |
| 22 | 3-(ethoxycarbonylmethyl)-2,4-bis(ethoxycarbonyl)thiophene |
| 23 | 3-methyl-4-cyano-5-isocyanothiophene |
| 24 | 3-acetamido-2-(methoxycarbonyl)thiophene |

TABLE 1-continued
A Moieties
| No. | A |
|---|---|
| 25 | 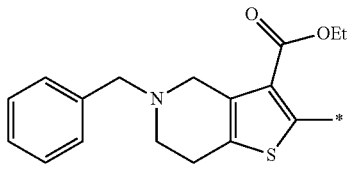 [SMILES: *c1sc2c(c1C(=O)OCC)CN(Cc1ccccc1)CC2] |
| 26 | 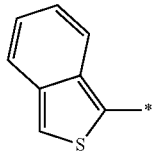 [SMILES: *c1scc2ccccc12] |
| 27 | 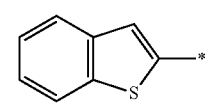 [SMILES: *c1cc2ccccc2s1] |
| 28 | 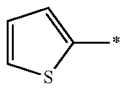 |
| 29 | 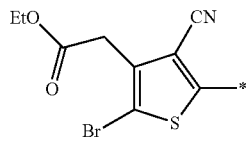 [SMILES: *c1sc(Br)c(CC(=O)OCC)c1C#N] |
| 30 | 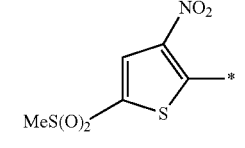 |
| 31 | 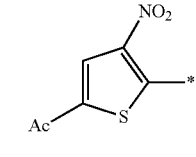 [SMILES: *c1sc(C(C)=O)cc1[N+](=O)[O-]] |
| 32 | 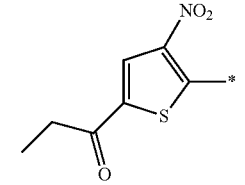 [SMILES: *c1sc(C(=O)CC)cc1[N+](=O)[O-]] |
| 33 | 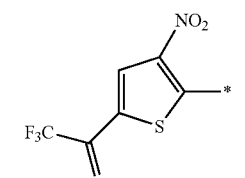 |
| 34 | 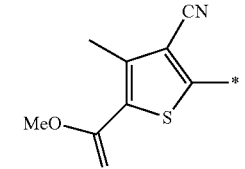 |
| 35 |  |
| 36 | 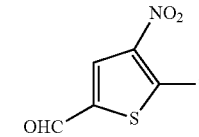 |
| 37 | 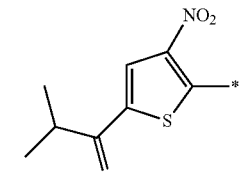 |
| 38 | 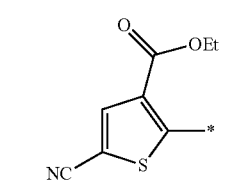 [SMILES: *c1sc(C#N)cc1C(=O)OCC] |
| 39 | 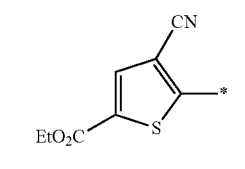 |
| 40 | 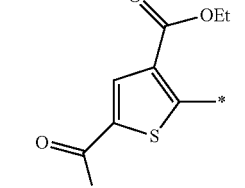 |
| 41 | 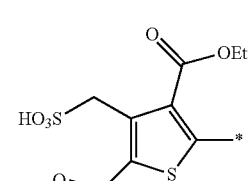 |

TABLE 1-continued
A Moieties
| No. | A |
|---|---|
| 42 | 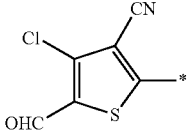 [SMILES: *c1sc(C=O)c(Cl)c1C#N] |
| 43 | 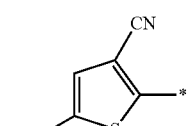 |
| 44 | 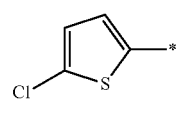 [SMILES: *c1ccc(Cl)s1] |
| 45 | 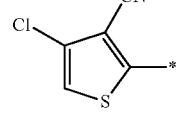 |
| 46 | 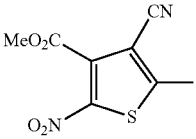 |
| 47 | 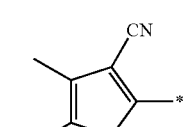 |
| 48 | 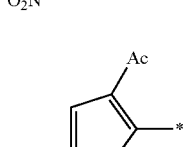 |
| 49 | 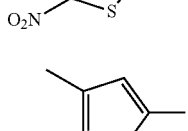 |
| 50 | 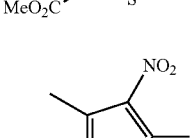 |
| 51 | 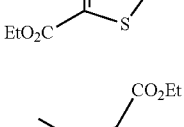 |
| 52 | 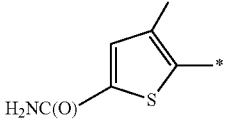 |
| 53 | 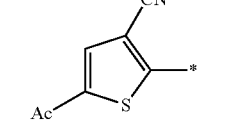 |
| 54 | 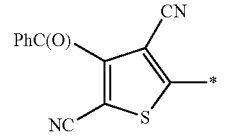 |
| 55 | 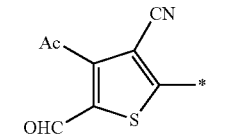 [SMILES: *c1sc(C=O)c(C(C)=O)c1C#N] |
| 56 | 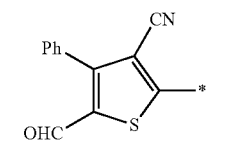 [SMILES: *c1sc(C=O)c(-c2ccccc2)c1C#N] |
| 57 | 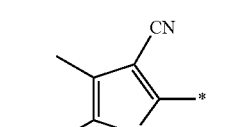 |
| 58 | 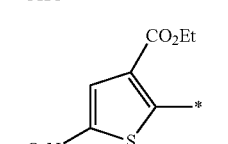 |
| 59 | 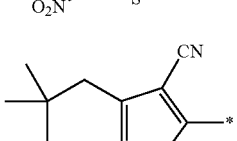 |
| 60 | 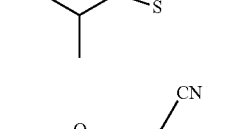 |
| 61 | 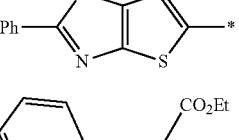 |

TABLE 1-continued
A Moieties
| No. | A |
|---|---|
| 62 | 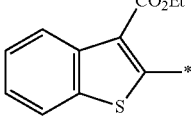 |
| 63 | 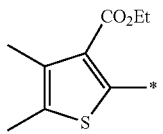 |
| 64 | 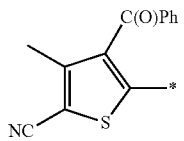 |
| 65 | 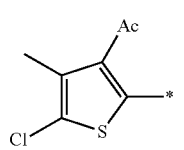 |
| 66 | 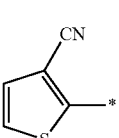 |
| 67 | 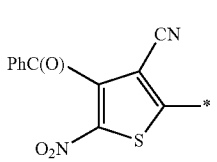 |
| 68 | 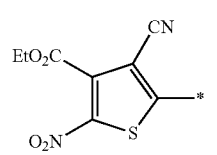 |
| 69 | 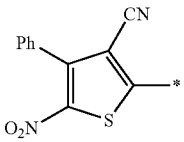 |
| 70 | 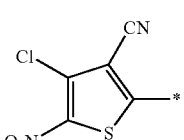 |
| 71 | 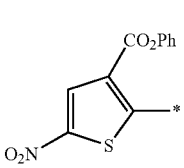 [SMILES: *c1sc([N+](=O)[O-])cc1C(=O)OCC] |
| 72 | 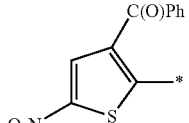 |
| 73 | 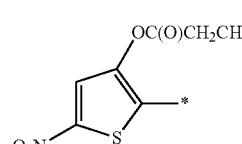 |
| 74 | 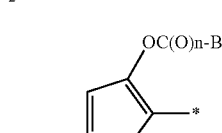 |
| 75 | 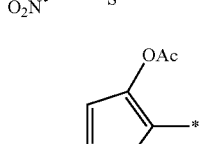 |
| 76 | 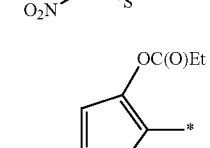 |
| 77 | 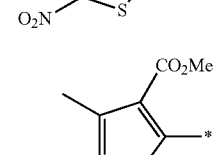 |
| 78 | 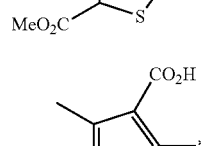 |
| 79 | 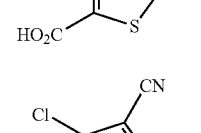 |
| 80 | 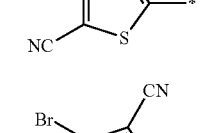 |
| 81 | 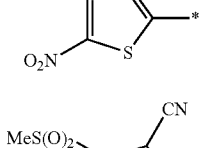 |

TABLE 1-continued
A Moieties
| No. | A |
|---|---|
| 82 | 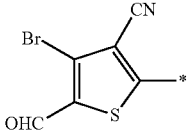 [SMILES: *c1sc(C=O)c(Br)c1C#N] |
| 83 | 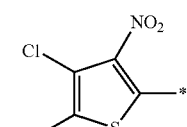 |
| 84 | 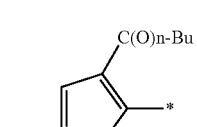 |
| 85 | 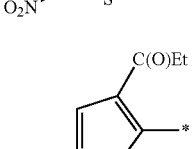 |
| 86 | 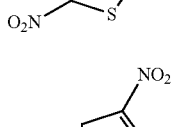 |
| 87 | 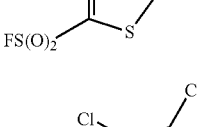 |
| 88 | 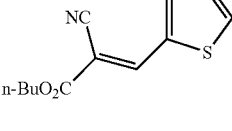 |
| 89 | 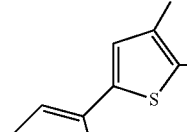 |
| 90 | 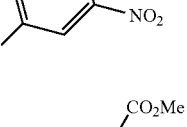 |
| 91 | 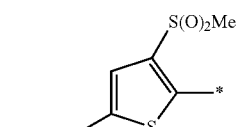 |
| 92 |  |
| 93 | 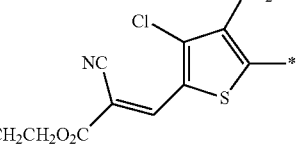 |
| 94 |  |
| 95 | 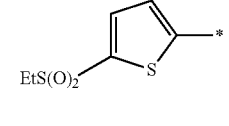 |
| 96 | 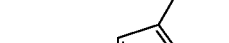 |
| 97 | 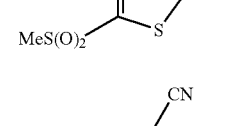 |
| 98 | 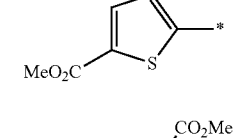 |

TABLE 1-continued

A Moieties

| No. | A |
|---|---|
| 99 | 5-(pyridin-2-yl)thiophene with CO₂Me at 3-position, attachment at 2-position |
| 100 | 5-(benzothiazol-2-yl)thiophene with CN at 3-position, attachment at 2-position |
| 101 | 5-(benzoxazol-2-yl)thiophene with CN at 3-position, attachment at 2-position |
| 102 | 5-(benzoxazol-2-yl)thiophene with CO₂Me at 3-position, attachment at 2-position |
| 103 | 5-nitrothiophene with C(O)NHCH₂CH=CH₂ at 3-position, attachment at 2-position |
| 104 | 5-nitrothiophene with SCN at 3-position, attachment at 2-position |
| 105 | 5-nitrothiophene with Br at 3-position, attachment at 2-position |
| 106 | 5-nitro-4-methylthiophene with CO₂Me at 3-position, attachment at 2-position |
| 107 | 5-[C(CN)=C(CH₃)-]thiophene with CO₂Me at 3-position, attachment at 2-position; substituent is =C(CN)CO₂Me linked via C(CH₃)= |
| 108 | 5-cyanothiophene, attachment at 2-position |
| 109 | 4,5-dimethylthiophene with CO₂Me at 3-position, attachment at 2-position |
| 110 | 5-nitro-4-methylthiophene with NO₂ at 3-position, attachment at 2-position |
| 111 | thiophene with CO₂Et at 3-position, CH₂SO₃H at 4-position, CHO at 5-position, attachment at 2-position |
| 112 | thiophene with CO₂Et at 3-position, CH₂SO₃H at 4-position, CN at 5-position, attachment at 2-position |
| 113 | thiophene with CN at 3-position, CH₂SO₃H at 4-position, CHO at 5-position, attachment at 2-position |
| 114 | thiophene with CN at 3-position, CH₂SO₃H at 4-position, CN at 5-position, attachment at 2-position |
| 115 | thiophene with C(O)NHEt at 3-position, CH₂SO₃H at 4-position, CHO at 5-position, attachment at 2-position |
| 116 | thiophene with C(O)NHEt at 3-position, CH₂SO₃H at 4-position, CN at 5-position, attachment at 2-position |

TABLE 1-continued

A Moieties

| No. | A |
|---|---|
| 117 | [structure: thiophene with HO$_3$S-CH$_2$-, CO$_2$Me, OHC, S, *] |
| 118 | [structure: thiophene with HO$_3$S-CH$_2$-, CO$_2$Me, NC, S, *] |

$R_6$ may be selected from the substituents shown in Table 2:

TABLE 2

$R_6$ Substituent-Identity and Position

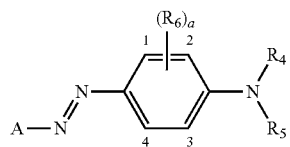

$R_6$ Substituent -Identity and Position on Aniline Ring

| No. | 1 | 2 | 3 | 4 |
|---|---|---|---|---|
| 1 | | | | —OH |
| 2 | | —Cl | | —OH |
| 3 | | —OMe | | —OH |
| 4 | | —On-Bu | | —OH |
| 5 | | | | —Me |
| 6 | | —Me | | —Me |
| 7 | | —OMe | | —Me |
| 8 | | —OEt | | —Me |
| 9 | | | | —Cl |

TABLE 2-continued $R_6$ Substituent-Identity and Position $R_6$ Substituent -Identity and Position on Aniline Ring

| No. | 1 | 2 | 3 | 4 |
|---|---|---|---|---|
| 10 | | | | —Br |
| 11 | | | | —NO$_2$ |
| 12 | | | | —NH$_2$ |
| 13 | | | | —NHAc |
| 14 | | —OMe | | —NHAc |
| 15 | | | | —NHC(O)Et |
| 16 | | —OMe | | —NHC(O)Et |
| 17 | | —OEt | | —NHC(O)Et |
| 18 | | | | —NHC(O)n-Pr |
| 19 | | —Me | | —NHC(O)n-Pr |
| 20 | | | | —NHC(O)i-Pr |
| 21 | | | | —NHC(O)n-Bu |
| 22 | | —OMe | | —NHC(O)n-Bu |
| 23 | | | | —NHC(O)c-C$_6$H$_{11}$ |
| 24 | | | | —NHC(O)Ph |
| 25 | | —OMe | | —NHC(O)Ph |
| 26 | | | | —NHC(O)CH$_2$OMe |
| 27 | | | | —NHC(O)CH$_2$OPh |
| 28 | | | | —NHC(O)CH$_2$CH$_2$OMe |
| 29 | | | | —NHC(O)CH$_2$CH$_2$OEt |
| 30 | | | | —NHC(O)(CH$_2$)$_2$CO$_2$CH$_2$CN |
| 31 | | | | —NHC(O)NH$_2$ |
| 32 | | | | —NHSO$_2$Me |
| 33 | | | | —NHSO$_2$Et |
| 34 | | —OMe | | —NHSO$_2$Et |
| 35 | | | | —NHSO$_2$Ph |
| 36 | | —OMe | | |
| 37 | | —Me | | |
| 38 | | —Cl | | |
| 39 | | —NO$_2$ | | |
| 40 | | —OMe | | —OMe |

$R_4$ and $R_5$ groupings may be selected from the groupings shown in Table 3:

TABLE 3
R₄ and R₅ Groupings
R₄ and R₅ Groupings
| No. | R₄ | R₅ |
|---|---|---|
| 1 | Ethyl | 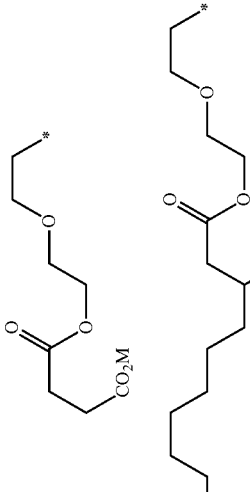 |
| 2 | Ethyl | 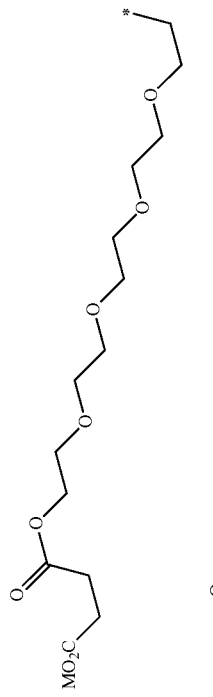 |
| 3 | Ethyl | 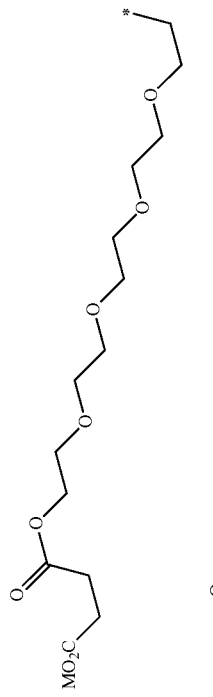 |
| 4 | Ethyl | 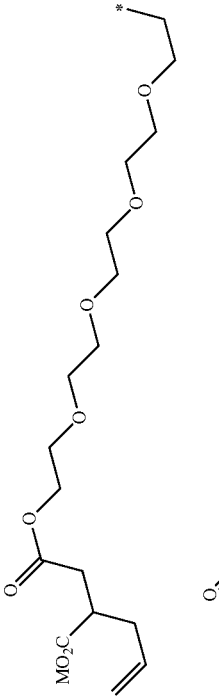 |
| 5 | Ethyl | 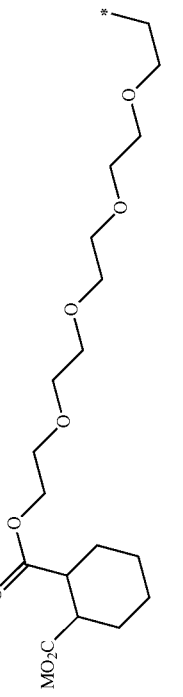 |

TABLE 3-continued
R4 and R5 Groupings
R4 and R5 Groupings
| No. | R4 | R5 |
|---|---|---|
| 6 | Ethyl |  |
| 7 | Ethyl | 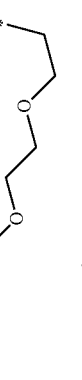 |
| 8 | Ethyl |  |
| 9 | Ethyl | 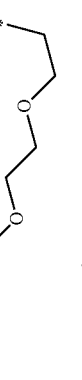 |

TABLE 3-continued
R$_4$ and R$_5$ Groupings
R$_3$ and R$_5$ Groupings
| No. | R$_4$ | R$_5$ |
|---|---|---|
| 10 | Ethyl | 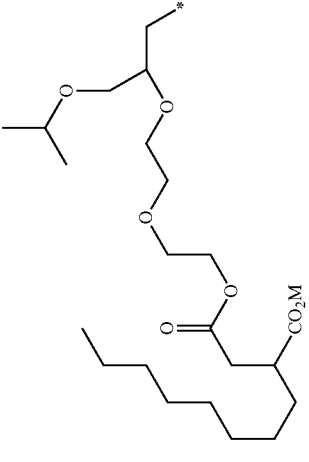 |
| 11 | Ethyl | 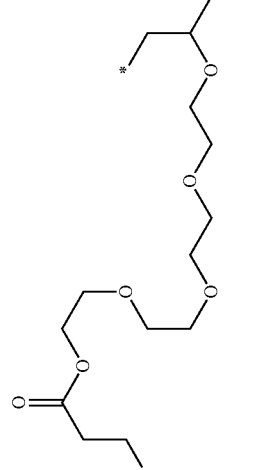 |
| 12 | Ethyl | 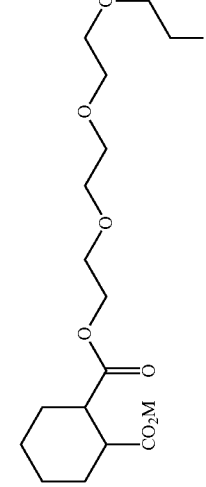 |

TABLE 3-continued

R₄ and R₅ Groupings
R₄ and R₅ Groupings

| No. | R₄ | R₅ |
|---|---|---|
| 13 | Ethyl | 2-carboxyphenyl ester of triethylene glycol (benzoate with ortho-CO₂M, linked via –O–CH₂CH₂–O–CH₂CH₂–O–CH₂CH₂–*) |
| 14 | Ethyl | 2-(carboxymethyl)octanoate ester linked via –O–CH₂CH₂–O–CH₂CH₂–O–CH₂CH₂–O–CH₂CH₂–* |
| 15 | Ethyl | 4-carboxybutanoate ester linked via –O–CH₂CH₂–O–CH₂CH₂–O–CH₂CH₂–O–CH₂CH₂–* |
| 16 | Benzyl | 3-carboxypropanoate ester linked via –O–CH₂CH₂–* |
| 17 | Benzyl | 3-carboxydecanoate ester linked via –O–CH₂CH₂–O–CH₂CH₂–* |

TABLE 3-continued

R₄ and R₅ Groupings
R₄ and R₅ Groupings

| No. | R₄ | R₅ |
|---|---|---|
| 18 | Benzyl | MO₂C-(CH₂)₂-C(=O)-O-CH₂CH₂-O-CH₂CH₂-O-CH₂CH₂-O-CH₂CH₂-O-CH₂CH₂-* |
| 19 | Benzyl | MO₂C-CH(CH₂CH=CH₂)-CH₂-C(=O)-O-CH₂CH₂-O-CH₂CH₂-O-CH₂CH₂-O-CH₂CH₂-O-CH₂CH₂-* |
| 20 | Benzyl | 2-(MO₂C)-cyclohexyl-C(=O)-O-CH₂CH₂-O-CH₂CH₂-O-CH₂CH₂-O-CH₂CH₂-O-CH₂CH₂-* |
| 21 | Benzyl | MO₂C-CH(C₅H₁₁)-CH₂-C(=O)-O-CH₂CH₂-O-CH₂CH₂-O-CH₂CH₂-O-CH₂CH₂-O-CH₂CH₂-* |
| 22 | Benzyl | MO₂C-CH=CH-C(=O)-O-CH₂CH₂-O-CH₂CH₂-O-CH₂CH₂-O-CH₂CH₂-O-CH₂CH₂-* |

TABLE 3-continued

R4 and R5 Groupings
R4 and R5 Groupings

| No. | R4 | R5 |
|---|---|---|
| 23 | Benzyl | 2-(MO2C)-C6H4-C(O)O-CH2CH2-(OCH2CH2)3-* |
| 24 | Benzyl | 2-(MO2C)-cyclohexyl-C(O)O-CH2CH2-O-CH2CH2-O-CH(CH2-O-iPr)-* |
| 25 | Benzyl | CH3(CH2)6-CH(CO2M)-CH2-C(O)O-CH2-CH(*)-O-CH2-O-iPr |

TABLE 3-continued

R$_4$ and R$_5$ Groupings
R$_4$ and R$_5$ Groupings

| No. | R$_4$ | R$_5$ |
|---|---|---|
| 26 | Benzyl | (structure: MO$_2$C-CH$_2$CH$_2$-C(=O)-O-CH$_2$CH$_2$-O-CH$_2$CH$_2$-O-CH$_2$CH$_2$-O-CH$_2$CH$_2$-O-CH$_2$-CH(Ph)-*) |
| 27 | Benzyl | (structure: 2-(CO$_2$M)-cyclohexyl-C(=O)-O-CH$_2$CH$_2$-O-CH$_2$CH$_2$-O-CH$_2$CH$_2$-O-CH$_2$CH$_2$-*) |
| 28 | Benzyl | (structure: 2-(CO$_2$M)-phenyl-C(=O)-O-CH$_2$CH$_2$-O-CH$_2$CH$_2$-O-CH$_2$CH$_2$-O-CH$_2$CH$_2$-*) |
| 29 | Benzyl | (structure: MO$_2$C-CH$_2$-CH(C$_6$H$_{13}$)-CH$_2$-C(=O)-O-CH$_2$CH$_2$-O-CH$_2$CH$_2$-O-CH$_2$CH$_2$-O-CH$_2$CH$_2$-*) |

TABLE 3-continued
R$_4$ and R$_5$ Groupings
R$_4$ and R$_5$ Groupings
| No. | R$_4$ | R$_5$ |
|---|---|---|
| 30 | Benzyl | 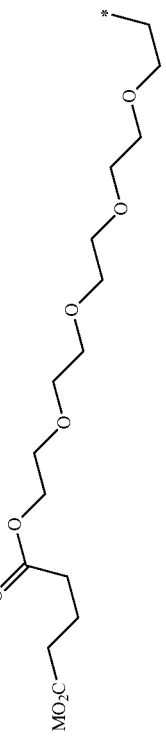 |
| 31 | Hexyl | 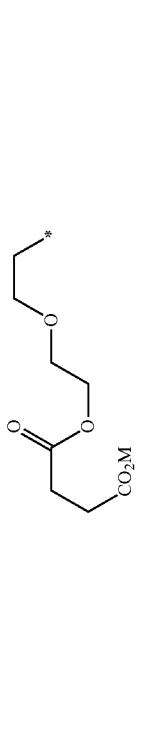 |
| 32 | Hexyl | 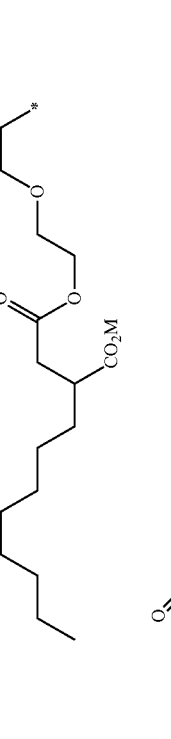 |
| 33 | Hexyl | 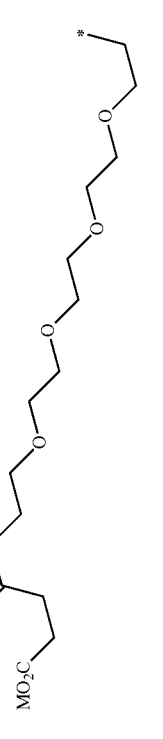 |
| 34 | Hexyl | 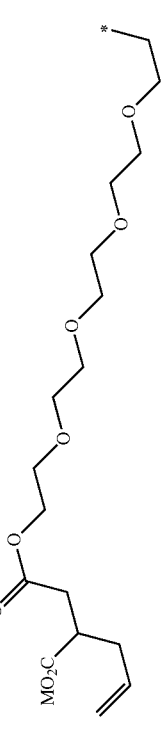 |

TABLE 3-continued
R4 and R5 Groupings
R4 and R5 Groupings
| No. | R4 | R5 |
|---|---|---|
| 35 | Hexyl |  |
| 36 | Hexyl |  |
| 37 | Hexyl |  |
| 38 | Hexyl |  |

TABLE 3-continued
R$_4$ and R$_5$ Groupings
R$_4$ and R$_5$ Groupings
| No. | R$_4$ | R$_5$ |
|---|---|---|
| 39 | Hexyl | 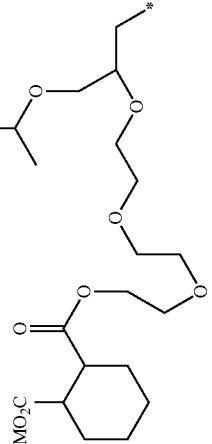 |
| 40 | Hexyl | 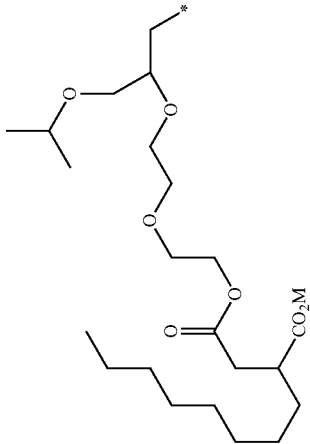 |
| 41 | Hexyl | 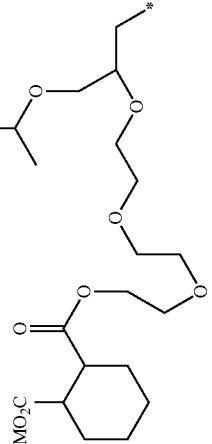 |

TABLE 3-continued

R$_4$ and R$_5$ Groupings
R$_4$ and R$_5$ Groupings

| No. | R$_4$ | R$_5$ |
|---|---|---|
| 42 | Hexyl | (cyclohexane with CO$_2$M and C(=O)O-CH$_2$CH$_2$-O-CH$_2$CH$_2$-O-CH$_2$CH$_2$-O-CH$_2$CH$_2$-*) |
| 43 | Hexyl | (benzene with CO$_2$M and C(=O)O-CH$_2$CH$_2$-O-CH$_2$CH$_2$-O-CH$_2$CH$_2$-O-CH$_2$CH$_2$-*) |
| 44 | Hexyl | MO$_2$C-CH$_2$-CH(hexyl)-C(=O)O-CH$_2$CH$_2$-O-CH$_2$CH$_2$-O-CH$_2$CH$_2$-O-CH$_2$CH$_2$-* |
| 45 | Hexyl | MO$_2$C-CH$_2$CH$_2$CH$_2$-C(=O)O-CH$_2$CH$_2$-O-CH$_2$CH$_2$-O-CH$_2$CH$_2$-O-CH$_2$CH$_2$-* |
| 46 | Isopropyl | MO$_2$C-CH$_2$CH$_2$-C(=O)O-CH$_2$CH$_2$-O-CH$_2$CH$_2$-* |

TABLE 3-continued
R4 and R5 Groupings
R4 and R5 Groupings
| No. | R4 | R5 |
|---|---|---|
| 47 | Isopropyl | 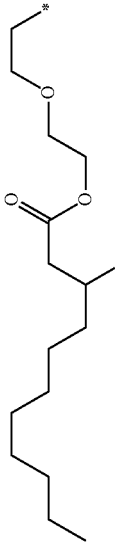 |
| 48 | Isopropyl | 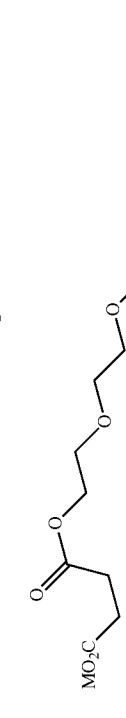 |
| 49 | Isopropyl |  |
| 50 | Isopropyl |  |
| 51 | Isopropyl | 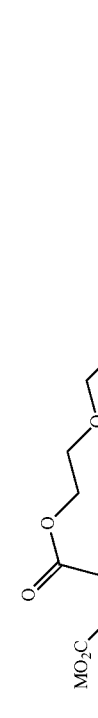 |

TABLE 3-continued
R$_4$ and R$_5$ Groupings
R$_4$ and R$_5$ Groupings
| No. | R$_4$ | R$_5$ |
|---|---|---|
| 52 | Isopropyl | 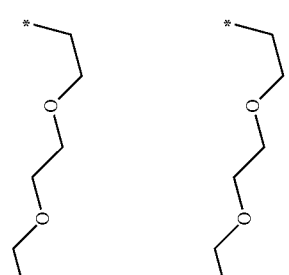 |
| 53 | Isopropyl | 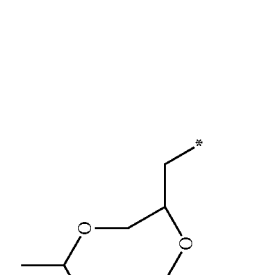 |
| 54 | Isopropyl | 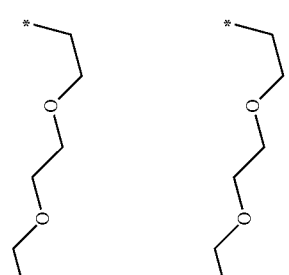 |
| 55 | Isopropyl | 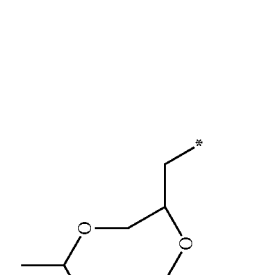 |

TABLE 3-continued

R₄ and R₅ Groupings

| No. | R₄ | R₅ |
|---|---|---|
| 56 | Isopropyl | (structure: *–O–CH(Ph)–CH₂–O–CH₂CH₂–O–CH₂CH₂–O–CH₂CH₂–O–CH₂CH₂–O–C(=O)–CH₂CH₂–CO₂M) |
| 57 | Isopropyl | (structure: *–CH₂CH₂–O–CH₂CH₂–O–CH₂CH₂–O–C(=O)–cyclohexyl–CO₂M) |
| 58 | Isopropyl | (structure: *–CH₂CH₂–O–CH₂CH₂–O–CH₂CH₂–O–C(=O)–phenyl–CO₂M) |
| 59 | Isopropyl | (structure: *–CH₂CH₂–O–CH₂CH₂–O–CH₂CH₂–O–CH₂CH₂–O–C(=O)–CH₂–CH(C₄H₉)(CH₂CO₂M)) |

TABLE 3-continued
R4 and R5 Groupings
R4 and R5 Groupings
| No. | R4 | R5 |
|---|---|---|
| 60 | Isopropyl |  |
| 61 |  |  |
| 62 |  |  |
| 63 |  |  |
| 64 |  |  |
| 65 |  |  |

TABLE 3-continued

R$_4$ and R$_5$ Groupings
R$_4$ and R$_5$ Groupings

| No. | R$_4$ | R$_5$ |
|---|---|---|
| 66 | [structure with CO$_2$M, allyl, ester linkage to ethoxyethyl*] | [structure with CO$_2$M, allyl, ester linkage to ethoxyethyl*] |
| 67 | [structure with CO$_2$M, ester linkage to ethoxyethyl*] | [structure with CO$_2$M, ester linkage to ethoxyethyl*] |
| 68 | [structure with CO$_2$M, hexyl chain, ester linkage to ethoxyethyl*] | [structure with CO$_2$M, hexyl chain, ester linkage to ethoxyethyl*] |
| 69 | Methoxyethyl | [structure with CO$_2$M, ester linkage to ethoxyethyl*] |
| 70 | Methoxyethyl | [structure with CO$_2$M, hexyl chain, ester linkage to ethoxyethyl*] |
| 71 | Methoxyethyl | [structure with MO$_2$C, ester linkage to polyethyleneglycol*] |

TABLE 3-continued
R4 and R5 Groupings
R4 and R5 Groupings
| No. | R4 | R5 |
|---|---|---|
| 72 | Methoxyethyl | 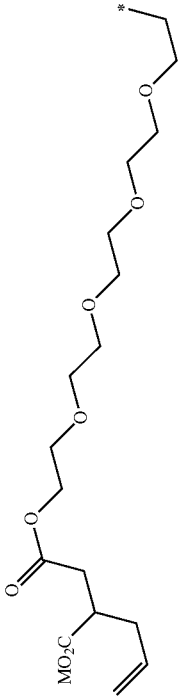 |
| 73 | Methoxyethyl | 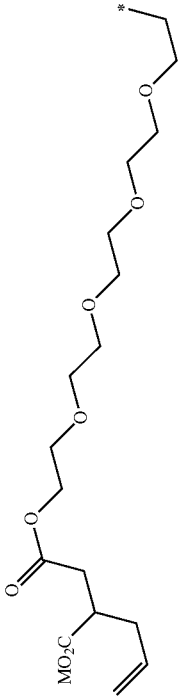 |
| 74 | Methoxyethyl | 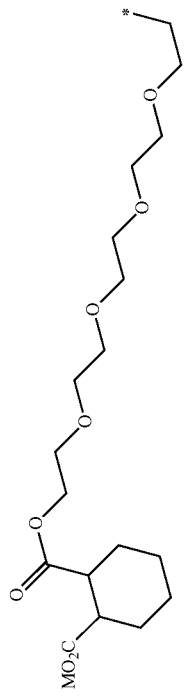 |
| 75 | Methoxyethyl | 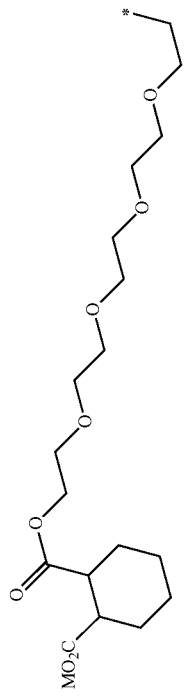 |
| 76 | Methoxyethyl | 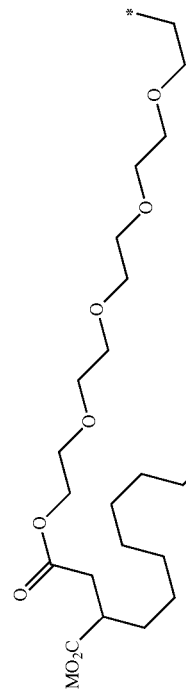 |

TABLE 3-continued

R$_4$ and R$_5$ Groupings
R$_4$ and R$_5$ Groupings

| No. | R$_4$ | R$_5$ |
|---|---|---|
| 77 | Methoxyethyl | (structure with isopropyl-O-CH$_2$-CH(O-)-CH$_2$* group linked via ethylene glycol chain to an ester of cyclohexane-carboxylate bearing MO$_2$C) |
| 78 | Methoxyethyl | (structure with isopropyl-O-CH$_2$-CH(O-)-CH$_2$* group linked via ethylene glycol to an ester of a long alkyl chain bearing CO$_2$M) |
| 79 | Methoxyethyl | (structure with *-CH$_2$-CH(Ph)-O-CH$_2$CH$_2$-O-CH$_2$CH$_2$-O-CH$_2$CH$_2$-O-C(=O)-CH$_2$CH$_2$-CO$_2$M) |

TABLE 3-continued
R4 and R5 Groupings
R4 and R5 Groupings
| No. | R4 | R5 |
|---|---|---|
| 80 | Methoxyethyl | 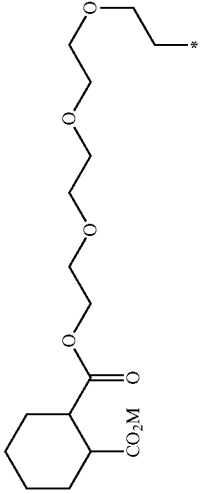 |
| 81 | Methoxyethyl | 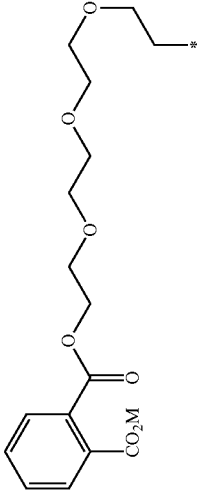 |
| 82 | Methoxyethyl | 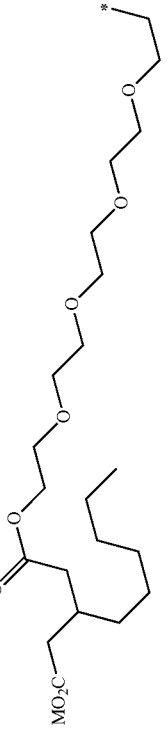 |
| 83 | Methoxyethyl | 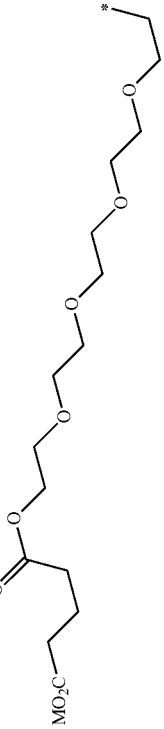 |
The "*" denotes point of attachment to additional moieties.
"M" denotes H or the appropriate charge balancing counterion.

X moieties may be selected from the moieties shown in Table 4:
TABLE 4
X Moieties
No.     G moieties may be selected from moieties 1-48 shown in Table 5.
1
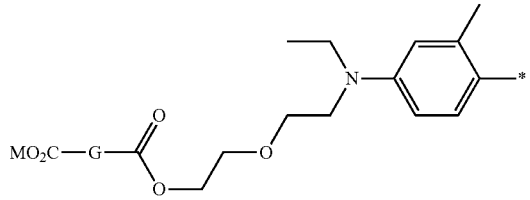
2
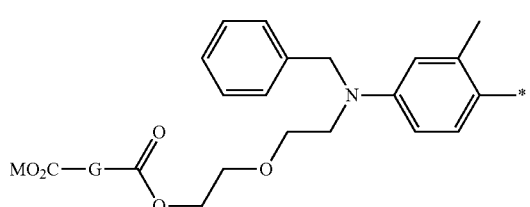
3
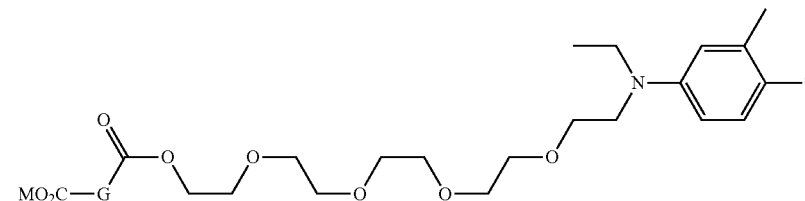
4
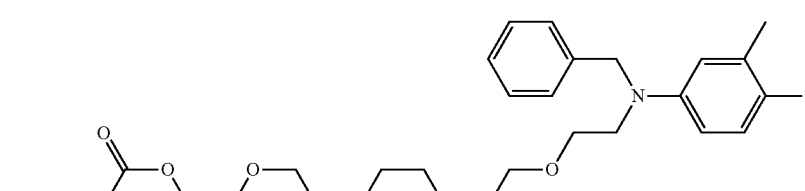
5
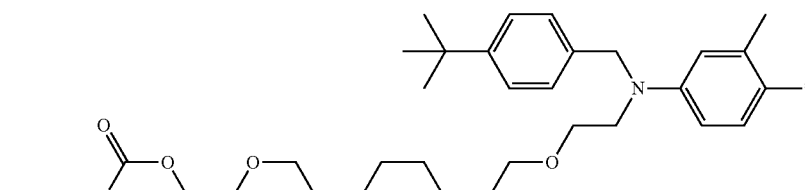
6
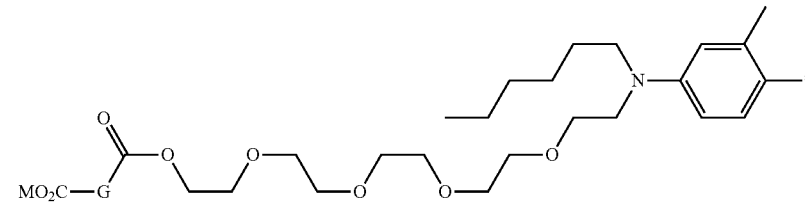

TABLE 4-continued
X Moieties
No. G moieties may be selected from moieties 1-48 shown in Table 5.
7 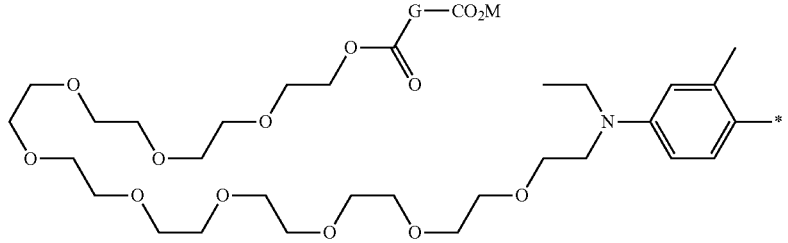
8 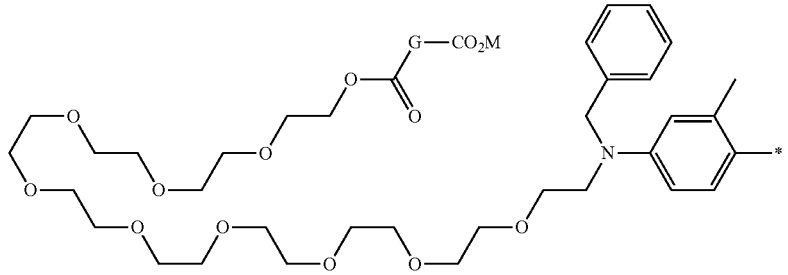
9 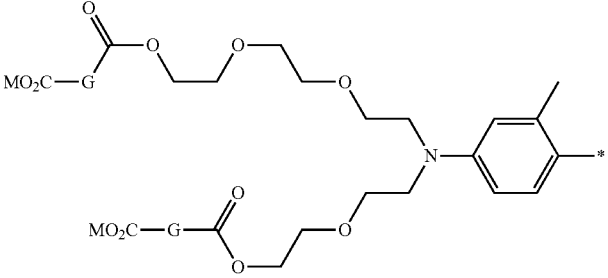
10 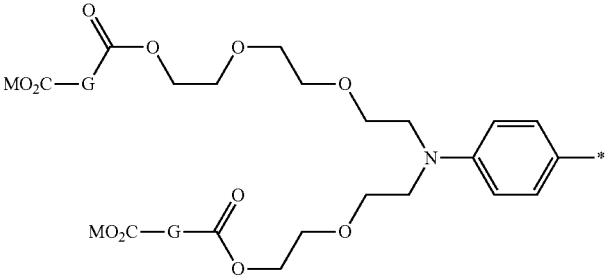
11 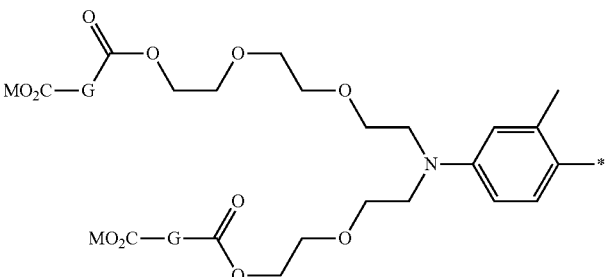

TABLE 4-continued

| | X Moieties |
|---|---|
| No. | G moieties may be selected from moieties 1-48 shown in Table 5. |

12

13

14

15

16

TABLE 4-continued
| X Moieties |
|---|
| No.     G moieties may be selected from moieties 1-48 shown in Table 5. |
17
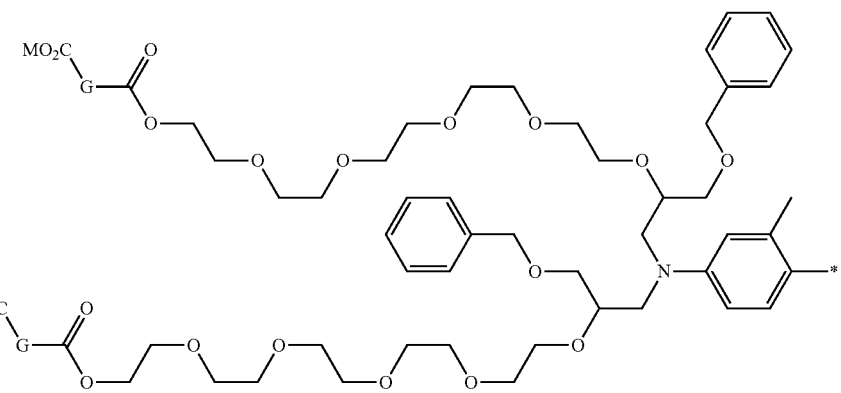
18
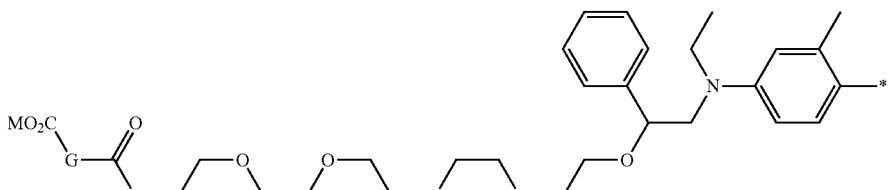
19
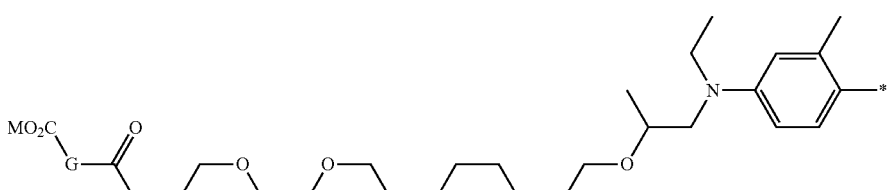
20
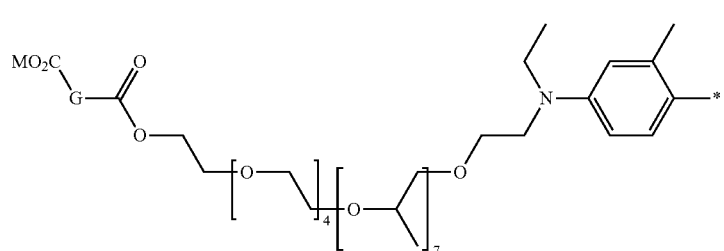
21
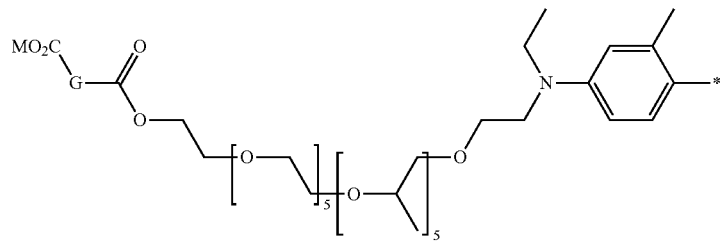

TABLE 4-continued
X Moieties
No. G moieties may be selected from moieties 1-48 shown in Table 5.
22 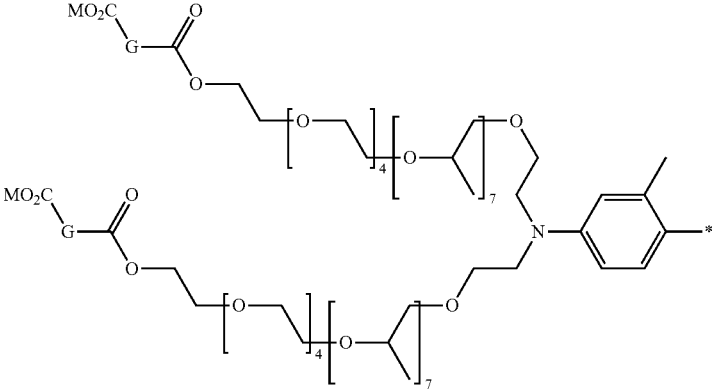
23 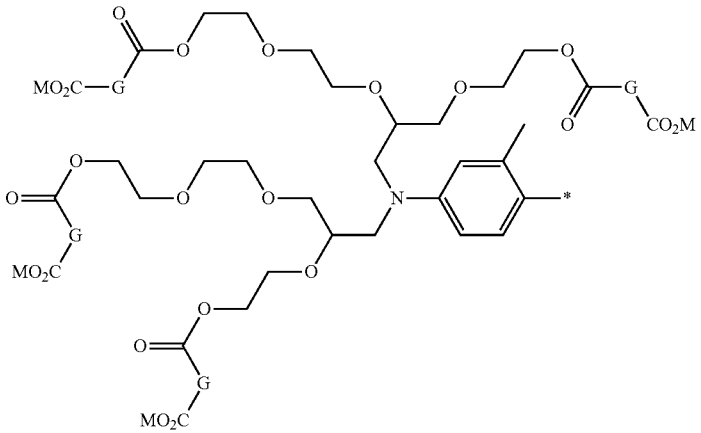
24 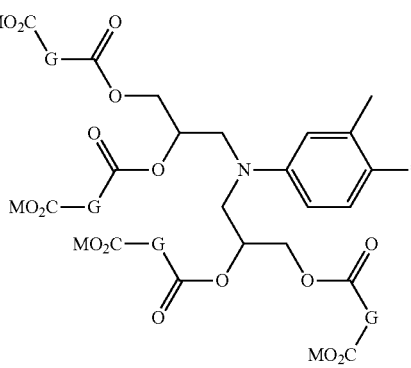

The "*" denotes point of attachment to the azo moiety.

G moieties in the X moieties in Table 4 above may be selected from moieties 1-48 shown in Table 5:

TABLE 5

G Moieties

| No. | G moiety |
|---|---|
| 1 | [structure] |
| 2 | [structure] |
| 3 | [structure] |
| 4 | [structure] |
| 5 | [structure] |
| 6 | [structure] |
| 7 | [structure] |
| 8 | [structure] |
| 9 | [structure] |
| 10 | [structure] |
| 11 | [structure] |
| 12 | [structure] |

TABLE 5-continued

G Moieties

| No. | G moiety |
|---|---|
| 13 | [structure] |
| 14 | [structure] |
| 15 | [structure] |
| 16 | [structure] |
| 17 | [structure, NO$_2$] |
| 18 | [structure, OMe, OMe] |
| 19 | [structure] |
| 20 | [structure] |
| 21 | [structure, CO$_2$Me] |
| 22 | [structure] |
| 23 | [structure] |
| 24 | [structure] |

TABLE 5-continued
G Moieties
| No. | G moiety |
|---|---|
| 25 | 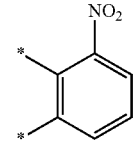 [SMILES: *c1cccc([N+](=O)[O-])c1*] |
| 26 | 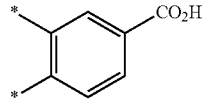 [SMILES: *c1ccc(C(=O)O)cc1*] |
| 27 | 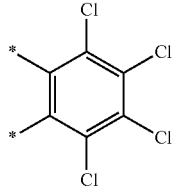 [SMILES: *c1c(*)c(Cl)c(Cl)c(Cl)c1Cl] |
| 28 | 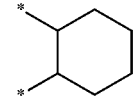 [SMILES: *C1CCCCC1*] |
| 29 | 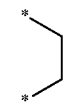 |
| 30 | 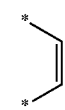 |
| 31 | 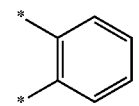 [SMILES: *c1ccccc1*] |
| 32 | 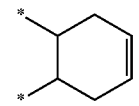 [SMILES: *C1CC=CCC1*] |
| 33 | 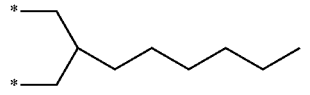 [SMILES: *CC(C*)CCCCCC] |
| 34 | 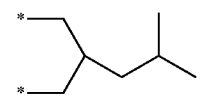 [SMILES: *CC(C*)CC(C)C] |
| 35 | 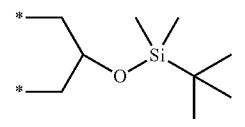 [SMILES: *CC(C*)O[Si](C)(C)C(C)(C)C] |
| 36 | 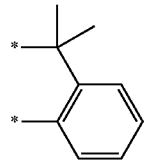 [SMILES: *c1ccccc1C(*)(C)C] |
| 37 | 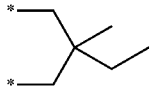 |
| 38 |  |
| 39 | 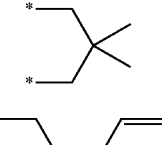 |
| 40 | 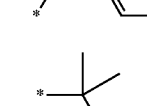 |
| 41 | 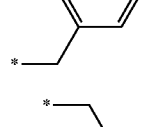 |
| 42 | 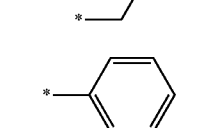 |
| 43 | 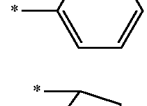 |
| 44 | 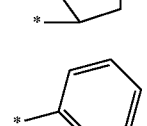 |
| 45 | 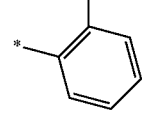 |
| 46 |  |

TABLE 5-continued

G Moieties

| No. | G moiety |
|---|---|
| 47 | (ortho-disubstituted benzene with *–CH2– linker, two attachment points *) |
| 48 | (heptamethylene chain, *–(CH2)7–*) |

Anhydrides suitable for use in creating the Y moiety in the instant invention include, but are not limited to, the following: 3-(2E)-2-dodecen-1-yldihydro-2,5-Furandione; (3aR,7aS)-rel-3a,4,7,7a-tetrahydro-4,7-Epoxyisobenzofuran-1,3-dione; 3-hexyldihydro-3-methyl-2,5-Furandione; 3-hexyldihydro-2,5-Furandione; (3aR,8aS)-rel-hexahydro-1H-Cyclohepta[c]furan-1,3(3aH)-dione; (3aR,6aS)-rel-tetrahydro-1H-Cyclopenta[c]furan-1,3(3aH)-dione; 5-(1,1-dimethylethyl)-1,3-Isobenzofurandione; dihydro-3-(phenylmethyl)-2,5-Furandione; 3-decyldihydro-2,5-Furandione; dihydro-3,3-dimethyl-2,5-Furandione; (3aR,4S,7R,7aS)-rel-hexahydro-4,7-Methanoisobenzofuran-1,3-dione; 3-ethyldihydro-2,5-Furandione; (3aR,7aS)-rel-3a,4,7,7a-tetrahydro-5,6-dimethyl-1,3-Isobenzofurandione; 3-(2-hexen-1-yl)dihydro-2,5-Furandione; dihydro-3-(2-propen-1-yl)-2,5-Furandione; hexahydro-4,7-Methanoisobenzofuran-1,3-dione; 5,6-dimethyl-1,3-Isobenzofurandione; tetrahydro-1H-Cyclopenta[c]furan-1,3(3aH)-dione; 5-nitro-1,3-Isobenzofurandione; hexahydro-4,7-Epoxyisobenzofuran-1,3-dione; 3a,4,7,7a-tetrahydro-4,7-Epoxyisobenzofuran-1,3-dione; 5,6-dimethoxy-1,3-Isobenzofurandione; dihydro-3-octyl-2,5-Furandione; dihydro-3-methyl-2,5-Furandione; 1,3-dihydro-1,3-dioxo-5-Isobenzofurancarboxylic acid, methyl ester; 3-dodecyldihydro-2,5-Furandione; dihydro-3-phenyl-2,5-Furandione; 3a,4,7,7a-tetrahydro-4,7-Methanoisobenzofuran-1,3-dione; 4-nitro-1,3-Isobenzofurandione; 1,3-dihydro-1,3-dioxo-5-Isobenzofurancarboxylic acid; (3aR,4S,7R,7aS)-rel-3a,4,7,7a-tetrahydro-4,7-Methanoisobenzofuran-1,3-dione; 4,5,6,7-tetrachloro-1,3-Isobenzofurandione; dihydro-2,5-Furandione; 1,3-Isobenzofurandione; 3a,4,7,7a-tetrahydro-1,3-Isobenzofurandione; hexahydro-1,3-Isobenzofurandione; (3aR,4S,7R,7aS)-rel-hexahydro-3a,7a-dimethyl-4,7-Epoxyisobenzofuran-1,3-dione; 4-hexyldihydro-2H-Pyran-2,6(3H)-dione; dihydro-4-(2-methylpropyl)-2H-Pyran-2,6(3H)-dione; 4-[[(1,1-dimethylethyl)dimethylsilyl]oxy]dihydro-2H-Pyran-2,6(3H)-dione; 4,4-dimethyl-1H-2-Benzopyran-1,3(4H)-dione; 4-ethyldihydro-4-methyl-2H-Pyran-2,6(3H)-dione; 8-Oxaspiro[4.5]decane-7,9-dione; dihydro-4,4-dimethyl-2H-Pyran-2,6(3H)-dione; dihydro-3-phenyl-2H-Pyran-2,6(3H)-dione; dihydro-3,3-dimethyl-2H-Pyran-2,6(3H)-dione; 1H-2-Benzopyran-1,3(4H)-dione; dihydro-2H-Pyran-2,6(3H)-dione; 1H,3H-Naphtho[1,8-cd]pyran-1,3-dione; 3-Oxabicyclo[3.2.1]octane-2,4-dione; Dibenz[c,e]oxepin-5,7-dione; 4,5-dihydro-2-Benzoxepin-1,3-dione; and 2,7-Oxepanedione. Such suitable anhydrides may be obtained from one or more of the following: 3B Scientific Corporation, Libertyville, Ill., 60048; Accel Pharmtech, LLC, East Brunswick, N.J., 08816; A Chemtek, Worcester, Mass., 01606; AK Scientific, Inc., Union City, Calif., 94587; AKos Consulting and Solutions Deutschland GmbH, Steinen, D-79585, Germany; Alfa Aesar, Ward Hill, Mass., 01835; Allichem LLC, Baltimore, Md., 21224; American Custom Chemicals Corp., San Diego, Calif., 92196-2527; Aurora Fine Chemicals LLC, San Diego, Calif., 92126; Beta Pharma Scientific, Inc., Branford, Conn., 06405; City Chemical LLC, West Haven, Conn., 06516; Ryan Scientific, Inc., Mt. Pleasant, S.C., 29465; Sigma-Aldrich, St. Louis, Mo., 63178; TCI America, Portland, Oreg., 97203; Waterstone Technology, Carmel, Ind., 46032; and Youchemicals Limited, Minhang, Shanghai, 201100, People's Republic of China.

It is contemplated to be within the scope of this invention that the thiophene azo carboxylate dye may comprise any one of the A moieties selected from Table 1, any one of the $R_6$ substituents selected from Table 2, any one of the $R_4$ and $R_5$ groupings selected from Table 3, any one of the X moieties selected from Table 4, and any one of the G moieties selected from Table 5.

In yet another aspect of the invention, suitable thiophene azo carboxylate dyes include, but are not limited to, the structures shown in Table 6:

TABLE 6

Thiophene Azo Carboxylate Dyes

| No. | Formula |
|---|---|
| Example 1 | (structure: $MO_2C$–CH2CH2–C(=O)–O–CH2CH2–O–CH2CH2–N(CH2CH3)–[2-methylphenyl]–N=N–[thiophene with 3-CN, 4-CH3, 5-CN]) |

TABLE 6-continued

Thiophene Azo Carboxylate Dyes

| No. | Formula |
|---|---|
| Example 2 | |
| Example 3 | |
| Example 4 | |
| Example 5 | |
| Example 6 | |
| Example 7 | |
| Example 8 | |

TABLE 6-continued

Thiophene Azo Carboxylate Dyes

| No. | Formula |
|---|---|
| Example 9 | |
| Example 10 | |
| Example 11 | |
| Example 12 | |
| Example 13 | |
| Example 14 | |
| Example 15 | |

TABLE 6-continued

Thiophene Azo Carboxylate Dyes

| No. | Formula |
|---|---|
| Example 16 | (structure) |
| Example 17 | (structure) |
| Example 18 | (structure) |
| Example 19 | (structure) |
| Example 20 | (structure) |
| Example 21 | (structure) |
| Example 22 | (structure) |

TABLE 6-continued
Thiophene Azo Carboxylate Dyes
| No. | Formula |
|---|---|
| Example 23 | 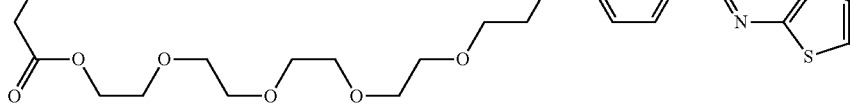 |
| Example 24 | 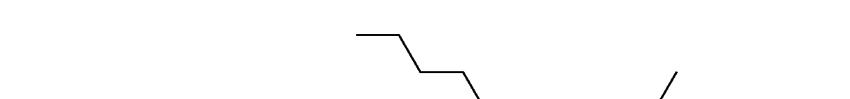 |
| Example 25 |  |
| Example 26 | 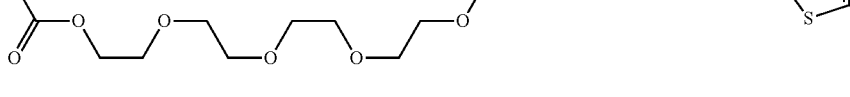 |
| Example 27 | 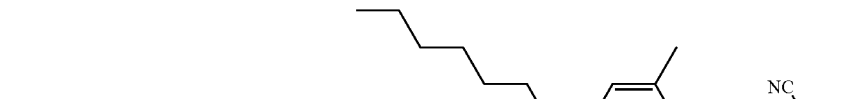 |
| Example 28 |  |

TABLE 6-continued

Thiophene Azo Carboxylate Dyes

| No. | Formula |
|---|---|
| Example 29 | |
| Example 30 | |
| Example 31 | |
| Example 32 | |
| Example 33 | |
| Example 34 | |
| Example 35 | |

TABLE 6-continued

Thiophene Azo Carboxylate Dyes

| No. | Formula |
|---|---|
| Example 36 | (structure) |
| Example 37 | (structure) |
| Example 38 | (structure) |
| Example 39 | (structure) |
| Example 40 | (structure) |
| Example 41 | (structure) |

TABLE 6-continued

Thiophene Azo Carboxylate Dyes

| No. | Formula |
|---|---|
| Example 42 | |
| Example 43 | |
| Example 44 | |
| Example 45 | |
| Example 46 | |

TABLE 6-continued

Thiophene Azo Carboxylate Dyes

| No. | Formula |
|---|---|
| Example 47 | 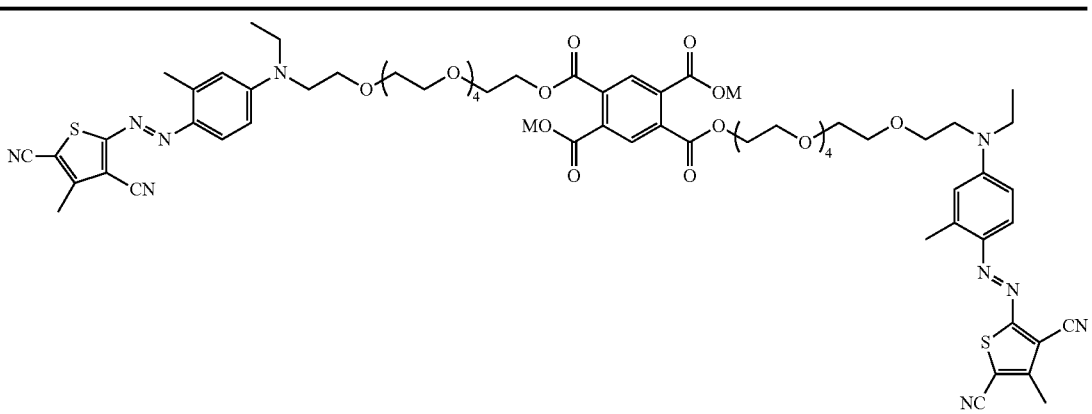 |
| Example 48 | 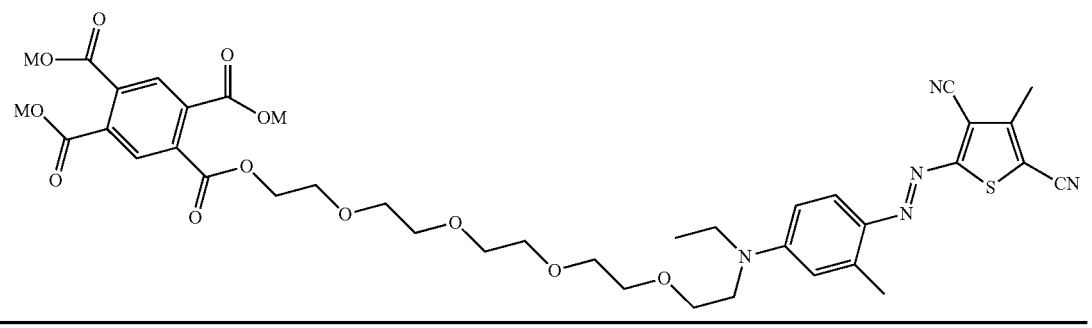 |

As indicated previously, the hueing agents described in the present specification may be incorporated into laundry care compositions including but not limited to laundry detergents and fabric care compositions. The laundry care compositions including laundry detergents may be in solid or liquid form, including a gel form, and/or unit does forms, including multi-compartment unit dose forms. Such compositions may comprise one or more of said hueing agents and a laundry care ingredient.

In one aspect, said laundry care composition may comprise, based on total laundry care composition weight, less than 15% builder, less than 10% builder, or even less than 5% builder.

In one aspect, said laundry care composition may comprise, based on total laundry care composition weight, a total of no more than 20% water; a total of no more than 15% water; a total of no more than 10% water; or even a total of no more than 5% water.

In one aspect, said laundry care composition may comprise, based on total laundry care composition weight, from about 10% to about 70% of a water-miscible organic solvent having a molecular weight of greater than 70 Daltons.

In one aspect, said laundry care composition may comprise, based on total laundry care composition weight, a perfume microcapsule comprising a core and a shell that encapsulates said core, said perfume microcapsule having a D[4,3] average particle of from about 0.01 microns to about 200 microns and optionally a formaldehyde scavenger that is supplied via the addition of the microcapsules (contained in a perfume microcapsule slurry that is added to the laundry care ingredient) and/or added directly to the laundry care composition. In one aspect, the shell of said perfume microcapsules may be made of any material, including materials selected from the group consisting of polyethylenes, polyamides, polystyrenes, polyisoprenes, polycarbonates, polyesters, polyacrylates, polyureas, polyurethanes, polyolefins, polysaccharides, epoxy resins, vinyl polymers, and mixtures thereof. In one aspect, useful shell materials include materials that are sufficiently impervious to the core material and the materials in the environment in which the perfume microcapsule will be employed, to permit the delivery perfume to be obtained. Suitable impervious shell materials include materials selected from the group consisting of reaction products of one or more amines with one or more aldehydes, such as urea cross-linked with formaldehyde or gluteraldehyde, melamine cross-linked with formaldehyde; gelatin-polyphosphate coacervates optionally cross-linked with gluteraldehyde; gelatin-gum Arabic coacervates; cross-linked silicone fluids; polyamine reacted with polyisocyanates and mixtures thereof. In one aspect, the shell material comprises melamine cross-linked with formaldehyde and/or a polyacrylate. Suitable perfume microcapsules may be obtained from Appleton Papers of Appleton Wis., USA.

In one aspect, suitable formaldehyde scavengers include materials selected from the group consisting of sodium bisulfite, urea, ethylene urea, cysteine, cysteamine, lysine, glycine, serine, carnosine, histidine, glutathione, 3,4-diaminobenzoic acid, allantoin, glycouril, anthranilic acid, methyl anthranilate, methyl 4-aminobenzoate, ethyl acetoacetate, acetoacetamide, malonamide, ascorbic acid, 1,3-dihydroxyacetone dimer, biuret, oxamide, benzoguanamine, pyroglutamic acid, pyrogallol, methyl gallate, ethyl gallate, propyl gallate, triethanol amine, succinamide, thiabendazole, benzotriazol, triazole, indoline, sulfanilic acid, oxamide, sorbitol, glucose, cellulose, poly(vinyl alcohol), partially hydrolyzed poly(vinylformamide), poly(vinyl amine), poly(ethylene imine), poly(oxyalkyleneamine), poly(vinyl alcohol)-co-poly(vinyl amine), poly(4-aminostyrene), poly (l-lysine), chitosan, hexane diol, ethylenediamine-N,N'-bisacetoacetamide, N-(2-ethylhexyl)acetoacetamide, 2-benzoylacetoacetamide, N-(3-phenylpropyl)acetoacetamide, lilial, helional, melonal, triplal, 5,5-dimethyl-1,3-cyclohexanedione, 2,4-dimethyl-3-cyclohexenecarboxaldehyde, 2,2-dimethyl-1,3-dioxan-4,6-dione, 2-pentanone, dibutyl amine, triethylenetetramine, ammonium hydroxide, benzylamine, hydroxycitronellol, cyclohexanone, 2-butanone, pentane dione, dehydroacetic acid, or a mixture thereof. These formaldehyde scavengers may be obtained from Sigma/Aldrich/Fluka of St. Louis, Mo. U.S.A. or PolySciences, Inc. of Warrington, Pa. U.S.A.

Such formaldehyde scavengers are typically combined with a slurry containing said perfume microcapsules, at a level, based on total slurry weight, of from about 2 wt. % to about 18 wt. %, from about 3.5 wt. % to about 14 wt. % or even from about 5 wt. % to about 13 wt. %.

In one aspect, such formaldehyde scavengers may be combined with a product containing a perfume microcapsule, said scavengers being combined with said product at a level, based on total product weight, of from about 0.005% to about 0.8%, alternatively from about 0.03% to about 0.5%, alternatively from about 0.065% to about 0.25% of the product formulation.

In another aspect, such formaldehyde scavengers may be combined with a slurry containing said perfume microcapsules, at a level, based on total slurry weight, of from about 2 wt. % to about 14 wt. %, from about 3.5 wt. % to about 14 wt. % or even from about 5 wt. % to about 14 wt. % and said slurry may be added to a product matrix to which addition an identical or different scavenger may be added at a level, based on total product weight, of from about 0.005% to about 0.5%, alternatively from about 0.01% to about 0.25%, alternatively from about 0.05% to about 0.15% of the product formulation.

In one aspect, one or more of the aforementioned formaldehyde scavengers may be combined with a liquid fabric enhancing product containing perfume microcapsules at a level, based on total liquid fabric enhancing product weight, of from about 0.005% to about 0.8%, alternatively from about 0.03% to about 0.4%, alternatively from about 0.06% to about 0.25% of the product formulation.

In one aspect, such formaldehyde scavengers may be combined with a liquid laundry detergent product containing perfume microcapsules, said scavengers being selected from the group consisting of sodium bisulfite, urea, ethylene urea, cysteine, cysteamine, lysine, glycine, serine, carnosine, histidine, glutathione, 3,4-diaminobenzoic acid, allantoin, glycouril, anthranilic acid, methyl anthranilate, methyl 4-aminobenzoate, ethyl acetoacetate, acetoacetamide, malonamide, ascorbic acid, 1,3-dihydroxyacetone dimer, biuret, oxamide, benzoguanamine, pyroglutamic acid, pyrogallol, methyl gallate, ethyl gallate, propyl gallate, triethanol amine, succinamide, thiabendazole, benzotriazol, triazole, indoline, sulfanilic acid, oxamide, sorbitol, glucose, cellulose, poly(vinyl alcohol), partially hydrolyzed poly(vinylformamide), poly (vinyl amine), poly(ethylene imine), poly(oxyalkyleneamine), poly(vinyl alcohol)-co-poly(vinyl amine), poly(4-aminostyrene), poly(l-lysine), chitosan, hexane diol, ethylenediamine-N,N'-bisacetoacetamide, N-(2-ethylhexyl) acetoacetamide, 2-benzoylacetoacetamide, N-(3-phenylpropyl)acetoacetamide, lilial, helional, melonal, triplal, 5,5-dimethyl-1,3-cyclohexanedione, 2,4-dimethyl-3-cyclohexenecarboxaldehyde, 2,2-dimethyl-1,3-dioxan-4,6-dione, 2-pentanone, dibutyl amine, triethylenetetramine, ammonium hydroxide, benzylamine, hydroxycitronellol, cyclohexanone, 2-butanone, pentane dione, dehydroacetic acid and mixtures thereof, and combined with said liquid laundry detergent product at a level, based on total liquid laundry detergent product weight, of from about 0.003 wt. % to about 0.20 wt. %, from about 0.03 wt. % to about 0.20 wt. % or even from about 0.06 wt. % to about 0.14 wt. %.

The hueing agents may be added to substrates using a variety of application techniques. For instance, for application to cellulose-containing textile substrates, the hueing agent may be included as a component of a laundry detergent. Thus, application to a cellulose-containing textile substrate actually occurs when a consumer adds laundry detergent to a washing machine. The hueing agent may be present in the laundry detergent composition in an amount from about 0.000001% to about 10% by weight of the composition, from about 0.00001% to about 10% by weight of the composition, from about 0.0001% to about 5% by weight of the composition, and even from about 0.0001% to about 1% by weight of the composition.

The laundry detergent composition typically comprises a surfactant in an amount sufficient to provide desired cleaning properties. In one aspect, the laundry detergent composition may comprise, based on total laundry detergent composition weight, from about 0.5% to about 99% of the surfactant; from about 1% to about 95% of the surfactant; from about 5% to about 90% of the surfactant, from about 5% to about 70% of the surfactant, or even from about 5% to about 40% of the surfactant. The surfactant may comprise anionic, nonionic, cationic, zwitterionic and/or amphoteric surfactants. In one aspect, the detergent composition comprises anionic surfactant, nonionic surfactant, or mixtures thereof.

Fabric care compositions are typically added in the rinse cycle, which is after the detergent solution has been used and replaced with the rinsing solution in typical laundering processes. The fabric care compositions disclosed herein may be comprise a rinse added fabric softening active and a suitable hueing agent as disclosed in the present specification. The fabric care composition may comprise, based on total fabric care composition weight, from about 1% to about 90%, or from about 5% to about 50% fabric softening active. The hueing agent may be present in the fabric care composition in an amount from about 0.5 ppb to about 50 ppm, or from about 0.5 ppm to about 30 ppm.

Suitable Laundry Care Ingredients

While not essential for the purposes of the present invention, the non-limiting list of laundry care ingredients illustrated hereinafter are suitable for use in the laundry care compositions and may be desirably incorporated in certain aspects of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular aspect. The total amount of such adjuncts may range, once the amount of dye is taken into consideration from about 90% to about 99.99999995% by weight of the laundry care composition.

The precise nature of these additional components, and levels of incorporation thereof, will depend on the physical form of the composition and the nature of the operation for which it is to be used. Suitable laundry care ingredients include, but are not limited to, fabric softening actives, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, perfume(s) including quadrant perfumes and additional perfume delivery systems including perfume loaded zeolites, starch encapsuled accords, and Schiff base pro-perfumes, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain aspects of Applicants' compositions do not contain one or more of the following adjuncts materials: fabric softening actives, bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10}$-$C_{16}$ alkyl benzene sulfonic acids, or $C_{11}$-$C_{14}$ alkyl benzene sulfonic acids. In one aspect, the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially useful are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In one aspect, R' is $C_{10}$-$C_{18}$ alkyl, n is from about 1 to 15, and M is sodium, potassium, ammonium, alkylammonium, or alkanolammonium. In one aspect, R' is a $C_{12}$-$C_{16}$, n is from about 1 to 6 and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3$-$M^+$ wherein R is typically a linear $C_8$-$C_{20}$ hydrocarbyl group, which may be straight chain or branched chain, and M is a water-solubilizing cation. In one aspect, R is a $C_{10}$-$C_{15}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) $C_{10}$-$C_{18}$ secondary (2,3) alkyl sulfates having formulae (I) and (II): wherein M in formulae (I) and (II) is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of suitable cations including sodium, potassium, ammonium, and mixtures thereof, and x is an integer of at least about 7, or at least about 9, and y is an integer of at least 8, or at least about 9; d) $C_{10}$-$C_{18}$ alkyl alkoxy sulfates ($AE_xS$) wherein x is from 1-30; e) $C_{10}$-$C_{18}$ alkyl alkoxy carboxylates in one aspect, comprising 1-5 ethoxy units; f) mid-chain branched alkyl sulfates as discussed in U.S. Pat. No. 6,020,303 and U.S. Pat. No. 6,060,443; g) mid-chain branched alkyl alkoxy sulfates as discussed in U.S. Pat. No. 6,008,181 and U.S. Pat. No. 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. In one aspect, for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. In one aspect, $R^1$ is an alkyl group, which may be primary or secondary, that comprises from about 9 to 15 carbon atoms, or from about 10 to 14 carbon atoms. In one aspect, the alkoxylated fatty alcohols will also be ethoxylated materials that contain from about 2 to 12 ethylene oxide moieties per molecule, or from about 3 to 10 ethylene oxide moieties per molecule.

The alkoxylated fatty alcohol materials useful in the liquid detergent compositions herein will frequently have a hydrophilic-lipophilic balance (HLB) which ranges from about 3 to 17 from about 6 to 15, or from about 8 to 15. Alkoxylated fatty alcohol nonionic surfactants have been marketed under the tradenames Neodol and Dobanol by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2 \cdot qH_2O$. In this formula, R is a relatively long-chain hydrocarbyl moiety which can be saturated or unsaturated, linear or branched, and can contain from 8 to 20, 10 to 16 carbon atoms, or is a $C_{12}$-$C_{16}$ primary alkyl. R' is a short-chain moiety, in one aspect R' may be selected from hydrogen, methyl and —$CH_2OH$. When x+y+z is different from 0, EO is ethyleneoxy, PO is propyleneneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, $BAE_x$, wherein x if from 1-30, as discussed in U.S. Pat. No. 6,153,577, U.S. Pat. No. 6,020,303 and U.S. Pat. No. 6,093,856; f) Alkylpolysaccharides as discussed in U.S. Pat. No. 4,565,647 to Llenado, issued Jan. 26, 1986; specifically alkylpolyglycosides as discussed in U.S. Pat. No. 4,483,780 and U.S. Pat. No. 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,660, 4,260,529 and U.S. Pat. No. 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (in one aspect $C_{12}$ to $C_{18}$) amine oxides and sulfo and hydroxy betaines, such as N-alkyl-N,N-dimethylamino-1-propane sulfonate where the alkyl group can be $C_8$ to $C_{18}$, or $C_{10}$ to $C_{14}$.

Non-limiting examples of ampholytic surfactants include aliphatic derivatives of secondary or tertiary amines, or aliphatic derivatives of heterocyclic secondary and tertiary amines in which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

Aqueous, Non-Surface Active Liquid Carrier

As noted, the laundry care compositions may be in the form of a solid, either in tablet or particulate form, including, but not limited to particles, flakes, sheets, or the like, or the compositions may be in the form of a liquid. The liquid detergent compositions may comprise an aqueous, non-surface active liquid carrier. Generally, the amount of the aqueous, non-surface active liquid carrier employed in the compositions herein will be effective to solubilize, suspend or disperse the composition components. For example, the liquid detergent compositions may comprise, based on total liquid detergent composition weight, from about 5% to about 90%, from about 10% to about 70%, or from about 20% to about 70% of the aqueous, non-surface active liquid carrier.

The most cost effective type of aqueous, non-surface active liquid carrier is typically water. Accordingly, the aqueous, non-surface active liquid carrier component will generally be mostly, if not completely, comprised of water. While other types of water-miscible liquids, such alkanols, diols, other polyols, ethers, amines, and the like, have been conventionally been added to liquid detergent compositions as co-solvents or stabilizers, for purposes of the present invention, the utilization of such water-miscible liquids typically is minimized to hold down composition cost. Accordingly, the aqueous liquid carrier component of the liquid detergent products herein will generally comprise water present in concentrations ranging from about 5% to about 90%, or from about 5% to about 70%, by weight of the liquid detergent composition.

Bleaching Agents

Bleaching Agents—The cleaning compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) photobleaches for example sulfonated zinc phthalocyanine;

(2) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C=O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C=O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Bleach Boosting Compounds—The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

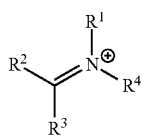

[I]

where $R^1$-$R^4$ may be a hydrogen or an unsubstituted or substituted radical selected from the group consisting of phenyl, aryl, heterocyclic ring, alkyl and cycloalkyl radicals.

Suitable bleach boosting compounds include zwitterionic bleach boosters zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

Peroxygen sources are well-known in the art and the peroxygen source employed in the present invention may comprise any of these well known sources, including peroxygen compounds as well as compounds, which under consumer use conditions, provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are typically employed in conjunction with a peroxygen source in the bleaching systems of the present invention.

Enzyme Bleaching—Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 g/m³ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

In one aspect, the fabric softening active ("FSA") is a quaternary ammonium compound suitable for softening fabric in a rinse step. In one aspect, the FSA is formed from a reaction product of a fatty acid and an aminoalcohol obtaining mixtures of mono-, di-, and, in one aspect, triester compounds. In another aspect, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain aspects of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

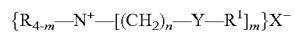

wherein each R substituent is either hydrogen, a short chain $C_1$-$C_6$, for example $C_1$-$C_3$ alkyl or hydroxyalkyl group, e.g., methyl, ethyl, propyl, hydroxyethyl, and the like, poly ($C_{2-3}$ alkoxy), for example, polyethoxy, group, benzyl, or mixtures thereof; each m is 2 or 3; each n is from 1 to about 4, or 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, or $C_{14}$-$C_{20}$, with each $R^1$ being a hydrocarbyl, or substituted hydrocarbyl group; it is acceptable for $R^1$ to be unsaturated or saturated and branched or linear and in one aspect it is linear; it is acceptable for each $R^1$ to be the same or different and typically these are the same; and X⁻ can be any softener-compatible anion, suitable anions include, chloride, bromide, methylsulfate, ethylsulfate, sulfate, phosphate, and nitrate, in one aspect the anions are chloride or methyl sulfate. Suitable DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardended tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one aspect, the FSA comprises other actives in addition to DQA (1) or DQA. In yet another aspect, the FSA comprises only DQA (1) or DQA and is free or essentially free of any other quaternary ammonium compounds or other actives. In yet another aspect, the FSA comprises the precursor amine that is used to produce the DQA.

In another aspect of the invention, the FSA comprises a compound, identified as DTTMAC comprising the formula:

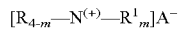

wherein each m is 2 or 3, each $R^1$ is a $C_6$-$C_{22}$, or $C_{14}$-$C_{20}$, but no more than one being less than about $C_{12}$ and then the other is at least about 16, hydrocarbyl, or substituted hydrocarbyl substituent, for example, $C_{10}$-$C_{20}$ alkyl or alkenyl (unsaturated alkyl, including polyunsaturated alkyl, also referred to sometimes as "alkylene"), in one aspect $C_{12}$-$C_{18}$ alkyl or alkenyl, and branch or unbranched. In one aspect, the Iodine Value (IV) of the FSA is from about 1 to 70; each R is H or a short chain $C_1$-$C_6$, or $C_1$-$C_3$ alkyl or hydroxyalkyl group, e.g., methyl, ethyl, propyl, hydroxyethyl, and the like, benzyl, or $(R^2O)_{2-4}H$ where each $R^2$ is a $C_{1-6}$ alkylene group; and A⁻ is a softener compatible anion, suitable anions include chloride, bromide, methylsulfate, ethylsulfate, sulfate, phosphate, or nitrate; in one aspect the anions are chloride or methyl sulfate.

Examples of these FSAs include dialkydimethylammonium salts and dialkylenedimethylammonium salts such as ditallowdimethylammonium and ditallowdimethylammonium methylsulfate. Examples of commercially available dialkylenedimethylammonium salts usable in the present invention are di-hydrogenated tallow dimethyl ammonium chloride and ditallowdimethyl ammonium chloride available from Degussa under the trade names Adogen® 442 and Adogen® 470 respectively. In one aspect, the FSA comprises other actives in addition to DTTMAC. In yet another aspect, the FSA comprises only compounds of the DTTMAC and is free or essentially free of any other quaternary ammonium compounds or other actives.

In one aspect, the FSA comprises an FSA described in U.S. Pat. Pub. No. 2004/0204337 A1, published Oct. 14, 2004 to Corona et al., from paragraphs 30-79. In another aspect, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one aspect, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one aspect, the FSA may also include amide containing compound compositions. Examples of diamide comprising compounds may include but not limited to methyl-bis(tallowamidoethyl)-2-hydroxyethylammonium methyl sulfate (available from Degussa under the trade names Varisoft 110 and Varisoft 222). An example of an amide-ester containing compound is N-[3-(stearoylamino)propyl]-N-[2-(stearoyloxy)ethoxy)ethyl)]-N-methylamine.

Another aspect of the invention provides for a rinse added fabric softening composition further comprising a cationic starch. Cationic starches are disclosed in US 2004/0204337 A1. In one aspect, the rinse added fabric softening composition comprises from about 0.1% to about 7% of cationic starch by weight of the fabric softening composition. In one aspect, the cationic starch is HCP401 from National Starch.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds, ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Processes of Making Laundry Care Compositions

The laundry care compositions of the present invention can be formulated into any suitable form and prepared by any process chosen by the formulator, non-limiting examples of which are described in Applicants' examples and in U.S. Pat. No. 5,879,584; U.S. Pat. No. 5,691,297; U.S. Pat. No. 5,574,005; U.S. Pat. No. 5,569,645; U.S. Pat. No. 5,565,422; U.S. Pat. No. 5,516,448; U.S. Pat. No. 5,489,392; U.S. Pat. No. 5,486,303 all of which are incorporated herein by reference.

The liquid detergent compositions may be in the form of an aqueous solution or uniform dispersion or suspension of surfactant, hueing agent, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, or from about 150 to 400 cps. For purposes of this invention, viscosity is measured with a Brookfield LVDV-II+ viscometer apparatus using a #21 spindle.

The liquid detergent compositions herein can be prepared by combining the components thereof in any convenient order and by mixing, e.g., agitating, the resulting component combination to form a phase stable liquid detergent composition. In a process for preparing such compositions, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In one aspect of forming the liquid detergent compositions, the hueing agent is first combined with one or more liquid components to form a hueing agent premix, and this hueing agent premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the hueing agent premix and the enzyme component are added at a final stage of component additions. In another aspect, the hueing agent is encapsulated prior to addition to the detergent composition, the encapsulated hueing agent is suspended in a structured liquid, and the suspension is added to a composition formulation containing a substantial portion of the balance of components of the laundry detergent composition.

As noted previously, the detergent compositions may be in a solid form. Suitable solid forms include tablets and particulate forms, for example, granular particles, flakes or sheets. Various techniques for forming detergent compositions in such solid forms are well known in the art and may be used herein. In one aspect, for example when the composition is in the form of a granular particle, the hueing agent is provided in particulate form, optionally including additional but not all components of the laundry detergent composition. The hueing agent particulate is combined with one or more additional particulates containing a balance of components of the laundry detergent composition. Further, the hueing agent, optionally including additional but not all components of the laundry detergent composition, may be provided in an encapsulated form, and the hueing agent encapsulate is combined with particulates containing a substantial balance of components of the laundry detergent composition.

The compositions of this invention, prepared as hereinbefore described, can be used to form aqueous washing solutions for use in the laundering of fabrics. Generally, an effective amount of such compositions is added to water, for example in a conventional fabric laundering automatic washing machine, to form such aqueous laundering solutions. The aqueous washing solution so formed is then contacted, typically under agitation, with the fabrics to be laundered therewith. An effective amount of the liquid detergent compositions herein added to water to form aqueous laundering solutions can comprise amounts sufficient to form from about 500 to 7,000 ppm of composition in aqueous washing solution, or from about 1,000 to 3,000 ppm of the detergent compositions herein will be provided in aqueous washing solution.

Method of Use

Certain of the consumer products disclosed herein can be used to clean or treat a situs inter alia a surface or fabric. Typically at least a portion of the situs is contacted with an embodiment of Applicants' consumer product, in neat form or diluted in a liquor, for example, a wash liquor and then the situs may be optionally washed and/or rinsed. In one aspect, a situs is optionally washed and/or rinsed, contacted with an aspect of the consumer product and then optionally washed and/or rinsed. For purposes of the present invention, washing includes but is not limited to, scrubbing, and mechanical agitation. The fabric may comprise most any fabric capable of being laundered or treated in normal consumer use conditions. Liquors that may comprise the disclosed compositions may have a pH of from about 3 to about 11.5. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Employing one or more of the aforementioned methods results in a treated situs.

In one aspect, a method of treating and/or cleaning a surface or fabric comprising the steps of optionally washing and/or rinsing said surface or fabric, contacting said surface or fabric with any laundry care composition disclosed in this specification, then optionally washing and/or rinsing said surface and/or fabric then optionally letting said surface or fabric to dry and/or actively drying said surface or fabric, is disclosed.

EXAMPLES

The following examples are provided to further illustrate the hueing agents of the present invention; however, they are not to be construed as limiting the invention as defined in the claims appended hereto. In fact, it will be apparent to those skilled in the art that various modifications and variations can be made in this invention without departing from the scope or spirit of the invention. All parts and percents given in these examples are by weight unless otherwise indicated.

Sample Preparation and Test Methods

A. Sample Preparation

The following general procedures were used to prepare the thiophene azo dyes of the present invention.

Preparation of Glycidol Materials

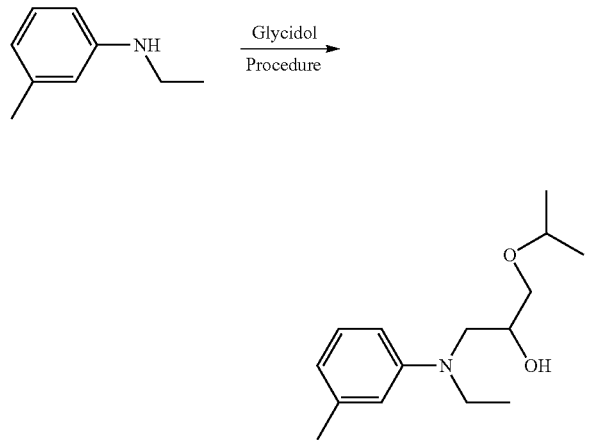

18 parts N-ethyl-m-toluidine, 52 parts isopropyl-glycidyl ether, and 50 parts toluene were charged into a 200 mL round bottom flask at room temperature. The mixture was refluxed overnight. The solvent was removed and the resulting material was used crude for the next step. These materials were then alkoxylated as described herein.

Preparation of Alkoxylated Intermediates

General Procedure for Alkoxylation—Method A:
Intermediate Type 1, Initial Single Site Polymer

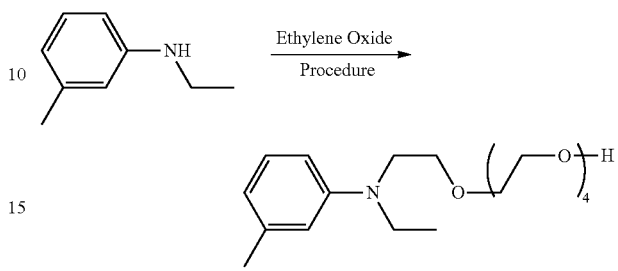

18 parts N-ethyl-m-toluidine, 14 parts acetic acid, and 20 parts water were charged into a 200 mL stainless steel autoclave at room temperature. 11 parts ethylene oxide was added over several hours. After the reaction was kept for 24 hours at room temperature, the vessel was charged with 0.2 parts NaOH and heated up to 125° C. Then, ethylene oxide was added over about 1 hour. After continuing the reaction for another 3 hours at 125° C., residual EO was removed by vacuum. Then it was cooled to room temperature and the intermediate obtained was an amber-colored viscous liquid. The constant average number of EO could be achieved every time by controlling the amount of ethylene oxide in the synthesis.

Intermediate Type 2, Initial Dual Chain Polymer

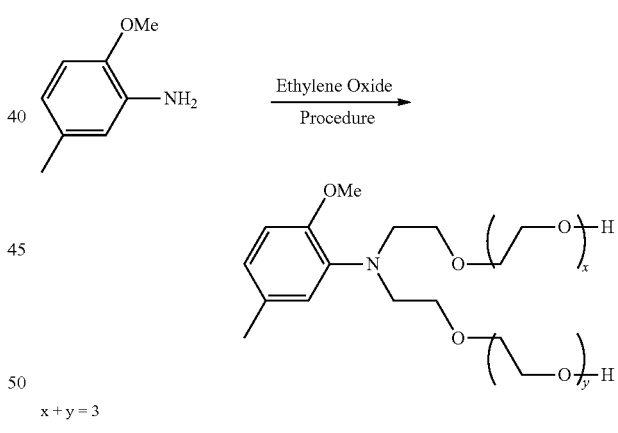

$x + y = 3$ 18 parts 2-Methoxy-5-methylaniline, 14 parts acetic acid, and 20 parts water were charged into a 200 mL stainless steel autoclave at room temperature. 22 parts ethylene oxide was added over several hours. After the reaction was kept for 24 hours at room temperature, the vessel was charged with 0.2 parts NaOH and heated up to 125° C. Then, 40 parts ethylene oxide was added over about 1 hour. After continuing the reaction for another 3 hours at 125° C., residual EO was removed by vacuum. Then it was cooled to room temperature and the intermediate obtained was an amber-colored viscous liquid. The constant average number of EO could be achieved every time by controlling the amount of ethylene oxide in the synthesis.

General Procedure for Alkoxylation—Method B:

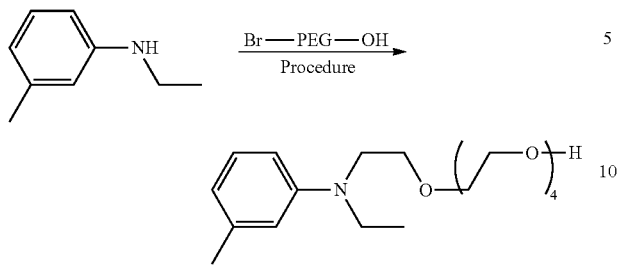

18 parts aniline, 60 parts mono-bromo-polyethylene glycol-200, 20 parts NaHCO$_3$ and 50 parts toluene were charged into a 200 mL round bottom flask at room temperature. The reaction mixture was heated to 80° C. for 5 hours. The salt was filtered and the solvent removed from the filtrate via low pressure distillation. The crude product was used with no further purification for the next step.

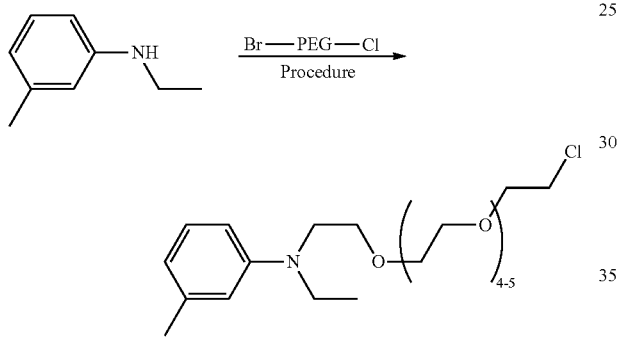

It is also possible to use a mono-bromo-mono-chloro glycol in order to directly make the halogenated product using this same procedure above.

General Procedures for Color Synthesis

All colors were prepared following the same general procedure.

Color Intermediate Synthesis for Example 1

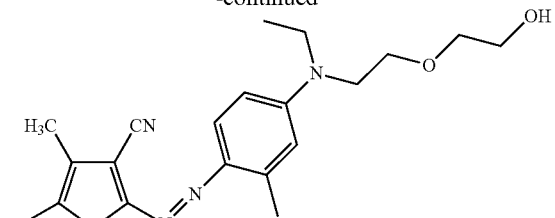

2 parts amino-thiophene, and 30 parts phosphoric acid, were charged into 200 mL glass flask and cooled to 0-5° C. 1 part NaNO$_2$ was slowly added as a solid, maintaining the temperature below 10° C. When addition was completed for diazotization, the mixture was stirred for 30 minutes and excess sodium nitrite was consumed by adding 0.3 parts sulfamic acid. Enough sulfamic acid was added until starch iodide paper provided a negative result. 5 parts of the m-toluidine ethoxylate coupler was added to a flask with 100 mL of water and the temperature lowered to 5 C. The prepared diazonium salt solution was slowly added into the above solution for coupling reaction. Care was taken to not allow the temperature to rise above 10° C. After complete addition of diazonium salt solution, the reaction was allowed to slowly reach room temperature over an hour. The mixture was then neutralized with sodium hydroxide and phase separated. The product layer was then dissolved with methanol and filtered to remove any excess salts. The filtrate was evaporated and the product of this reaction is ready to use at this point.

Addition of Anhydride to Color

Example 1

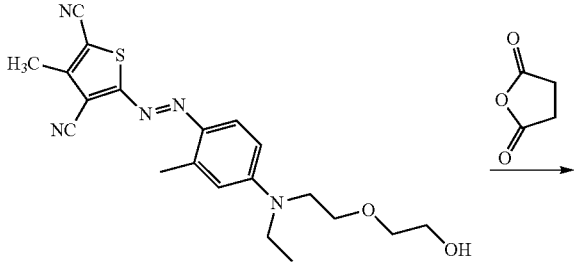

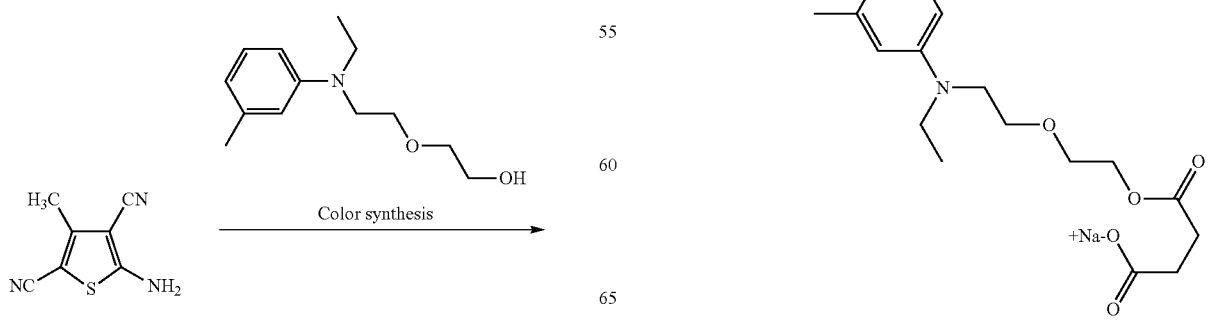

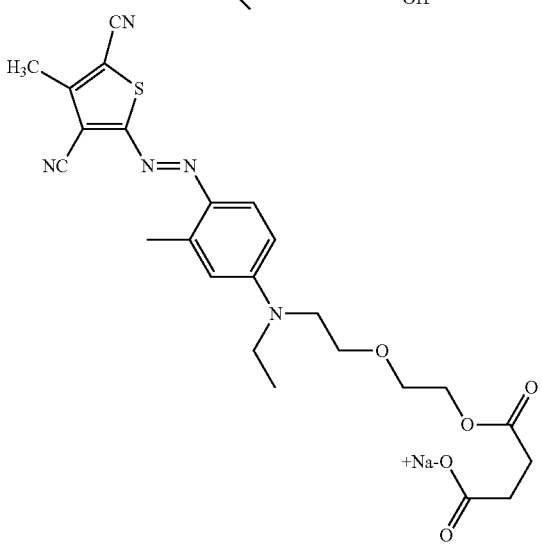

To 25 parts of the thiophene azo polymeric colorant is added 8 parts of succinic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 3

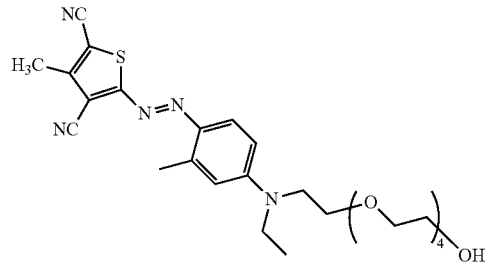

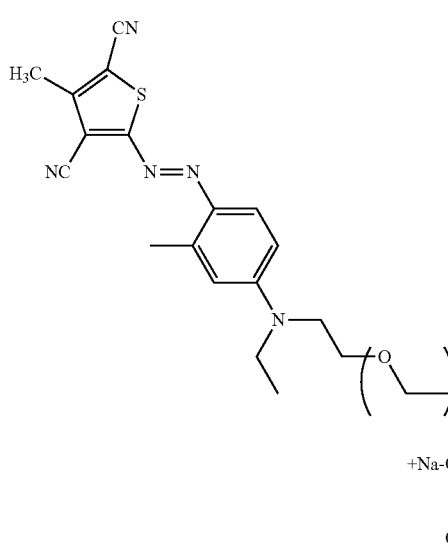

To 25 parts of the thiophene azo polymeric colorant is added 8 parts of succinic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 4

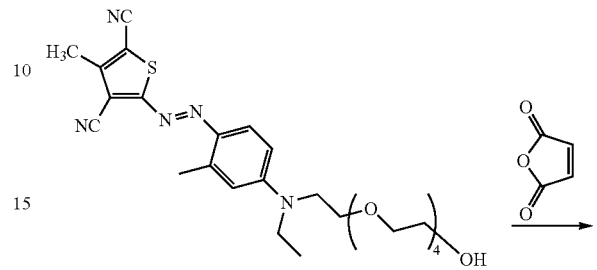

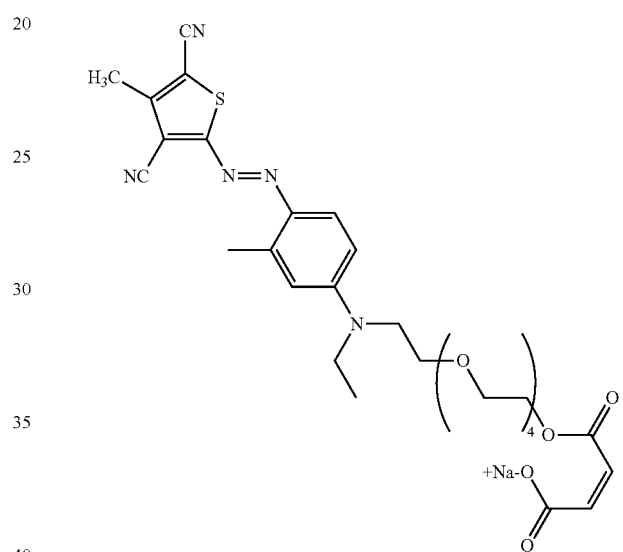

To 25 parts of the thiophene azo polymeric colorant is added 8 parts of maleic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 5

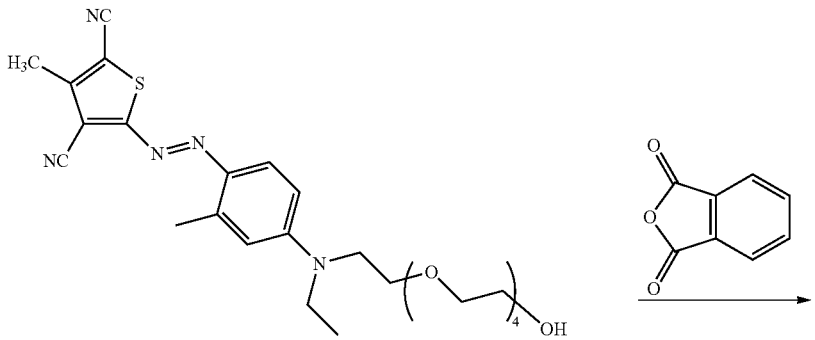

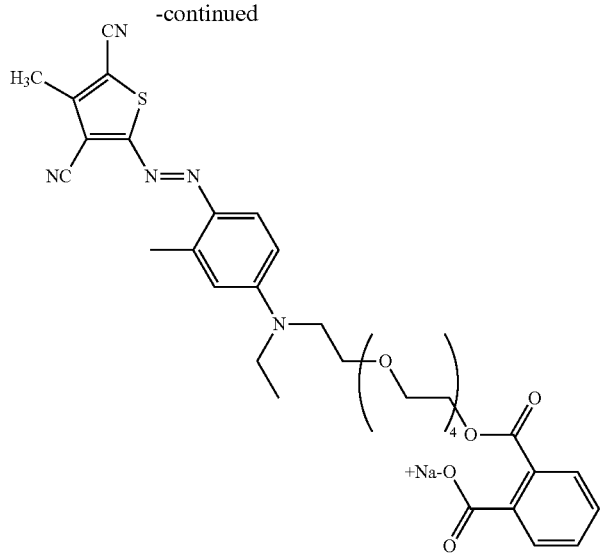

To 25 parts of the thiophene azo polymeric colorant is added 8 parts of phthalic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 7

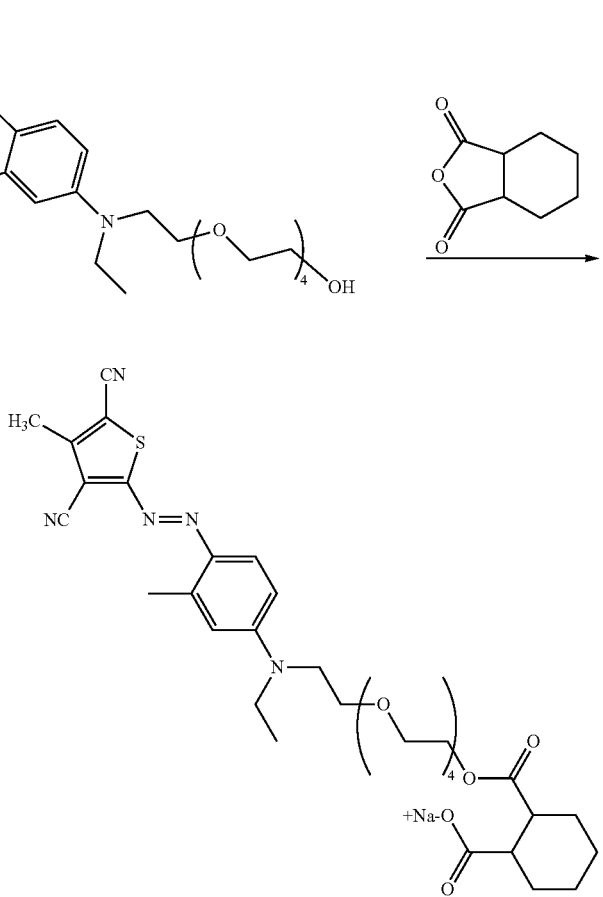

To 25 parts of the thiophene azo polymeric colorant is added 8 parts of hexahydrophthalic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 6

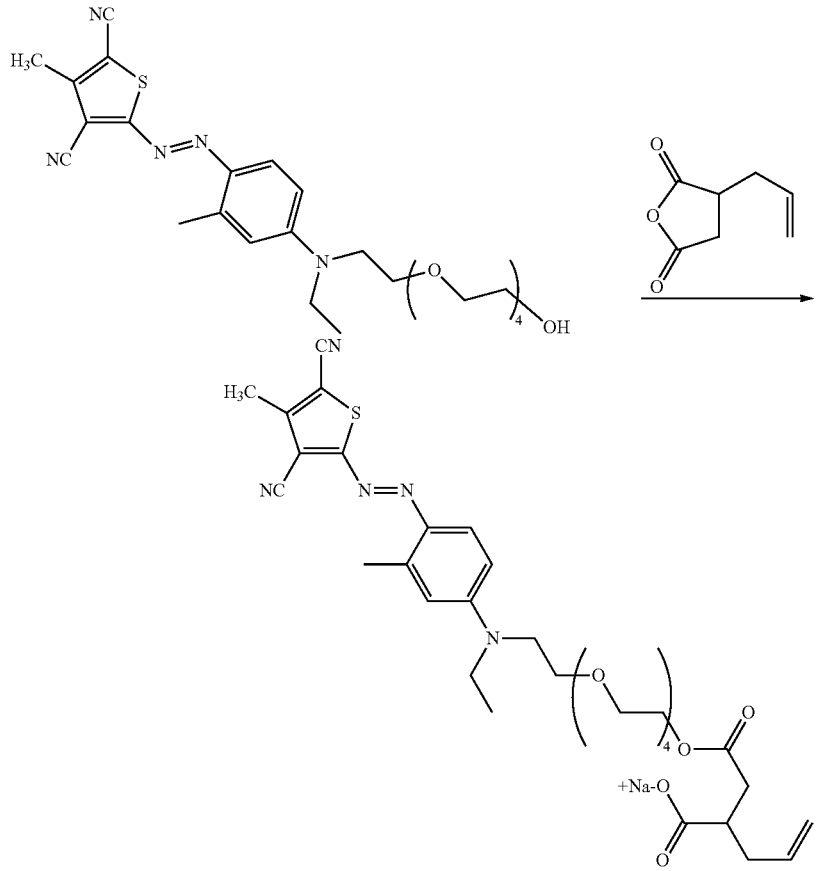

To 25 parts of the thiophene azo polymeric colorant is added 8 parts of allyl succinic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 8

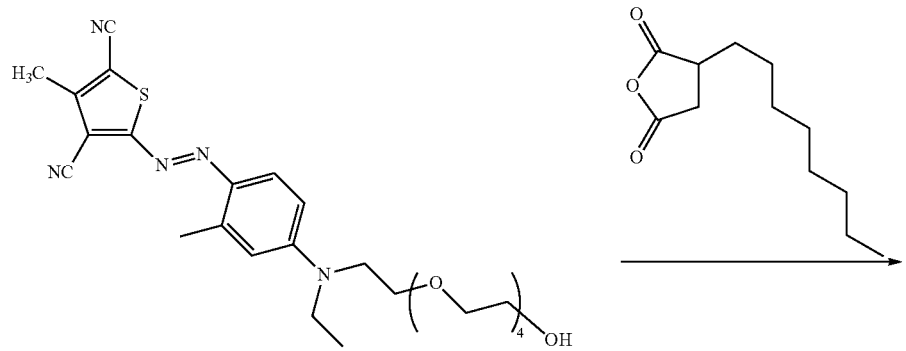

-continued

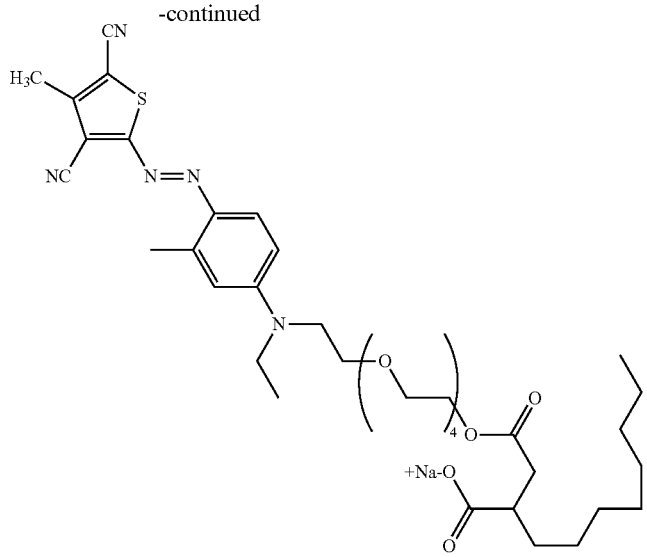

To 25 parts of the thiophene azo polymeric colorant is added 8 parts of octyl-succinic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 10

To 25 parts of the thiophene azo polymeric colorant is added 8 parts of succinic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 11

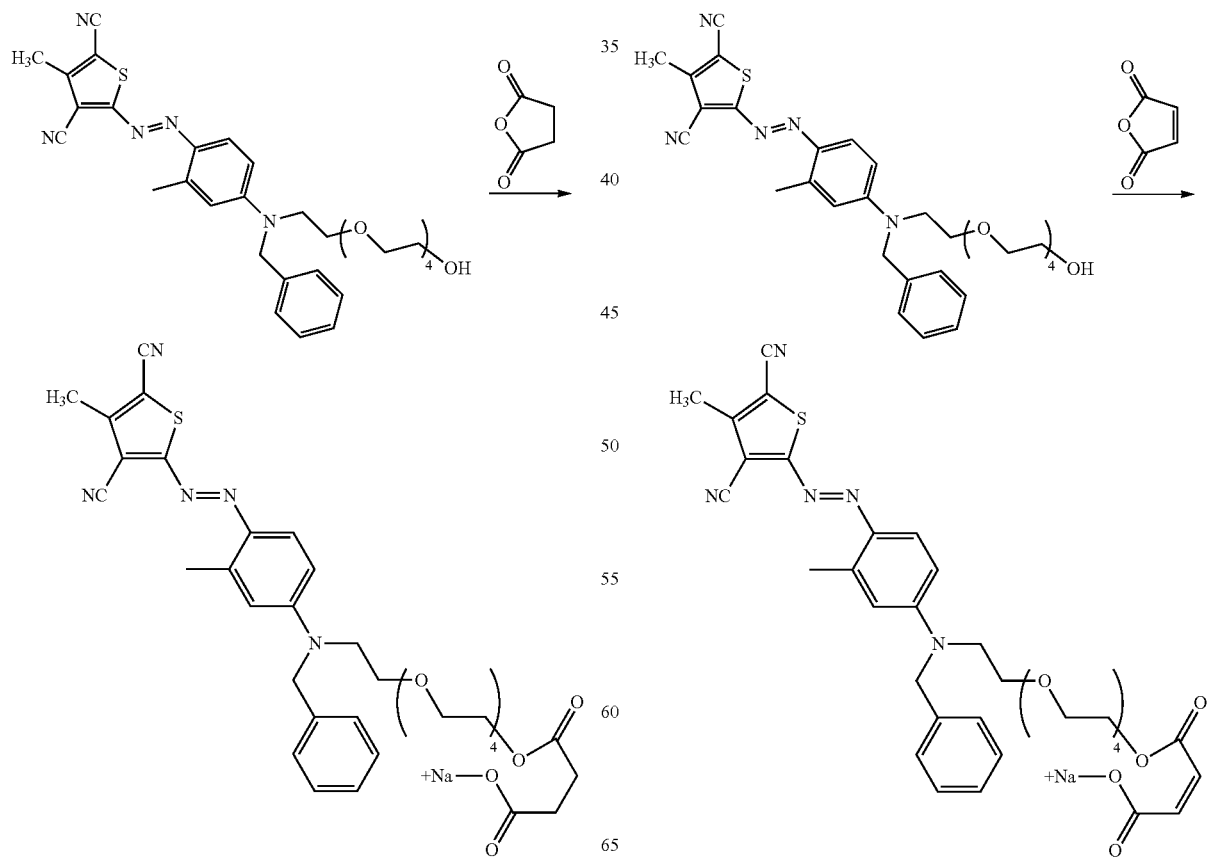

To 25 parts of the thiophene azo polymeric colorant is added 8 parts of maleic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 12

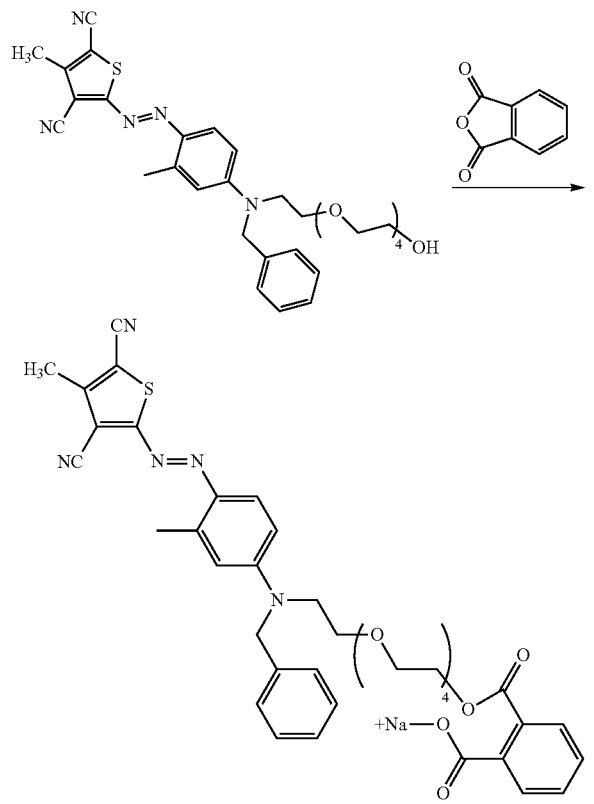

To 25 parts of the thiophene azo polymeric colorant is added 8 parts of phthalic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 14

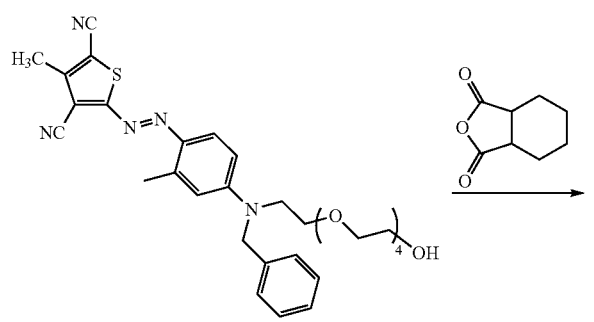

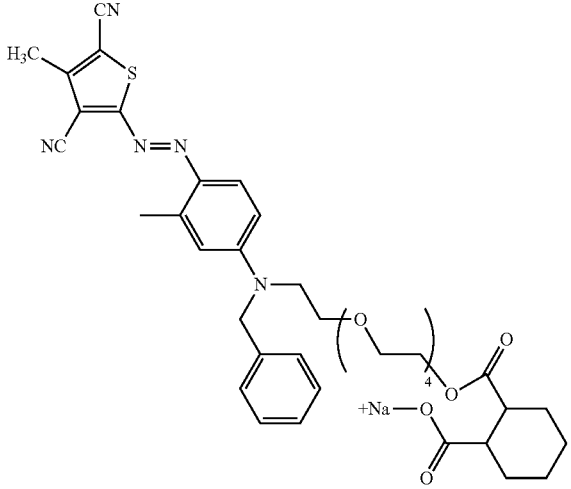

To 25 parts of the thiophene azo polymeric colorant is added 8 parts of hexahydrophthalic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 13

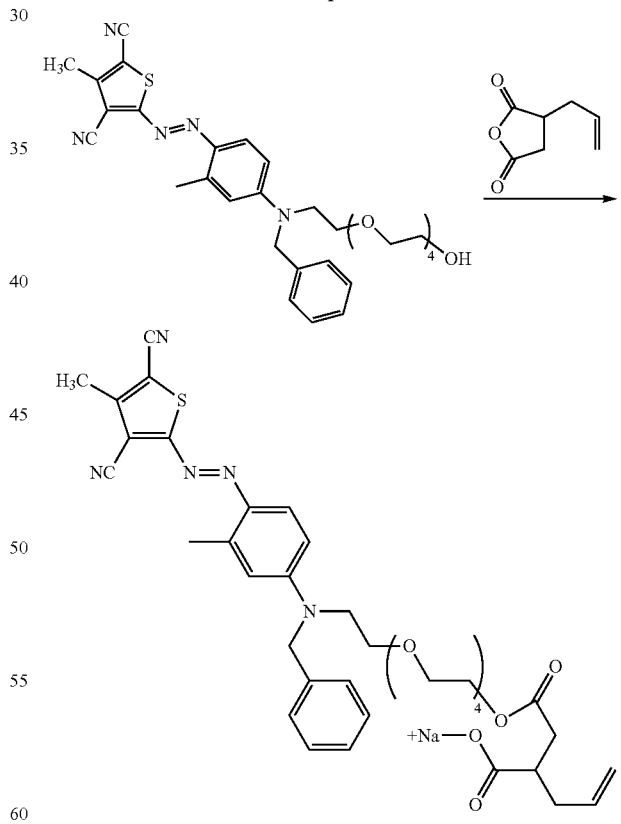

To 25 parts of the thiophene azo polymeric colorant is added 8 parts of allyl succinic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 15

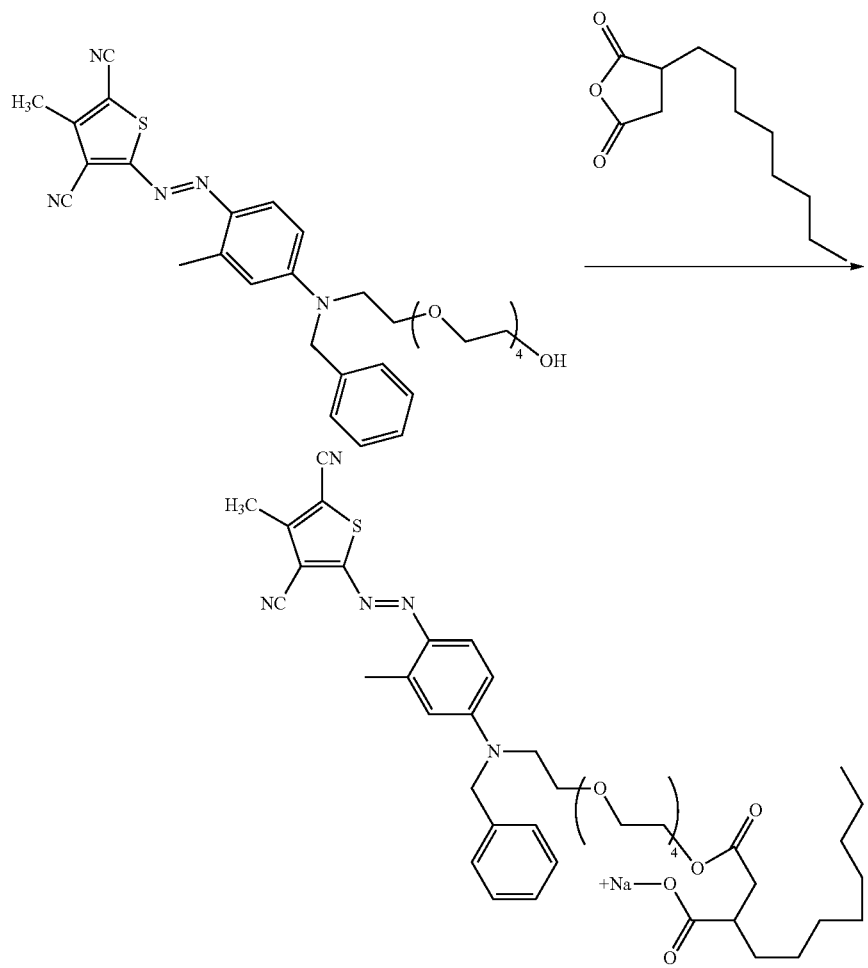

To 25 parts of the thiophene azo polymeric colorant is added 8 parts of octyl-succinic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 17

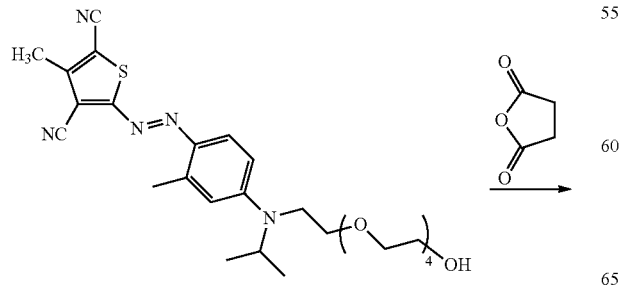

-continued

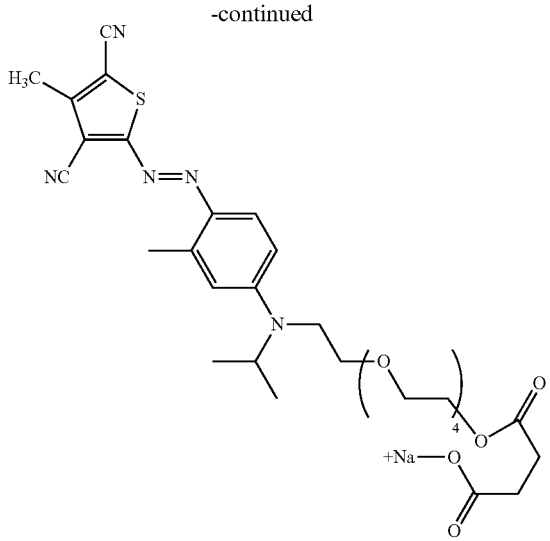

To 25 parts of the thiophene azo polymeric colorant is added 8 parts of succinic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 18

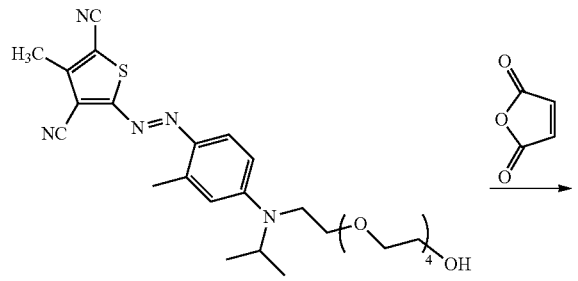

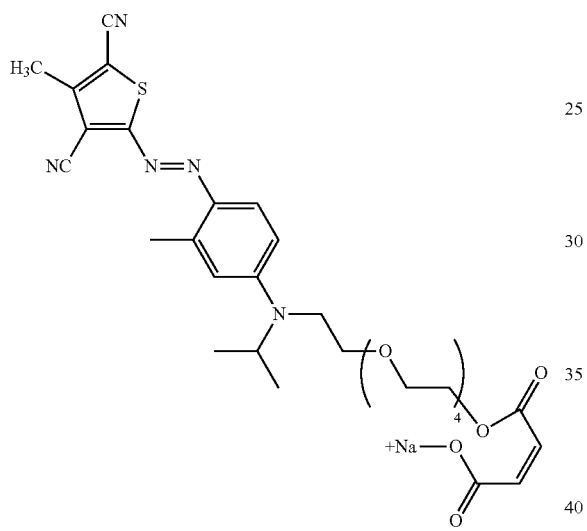

To 25 parts of the thiophene azo polymeric colorant is added 8 parts of maleic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 19

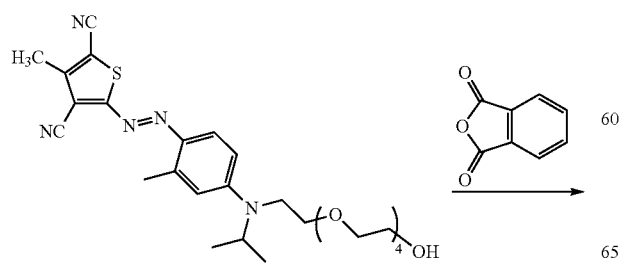

-continued

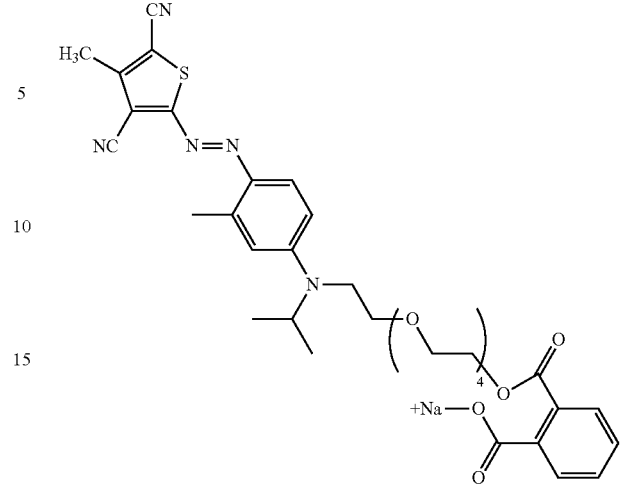

To 25 parts of the thiophene azo polymeric colorant is added 8 parts of phthalic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 21

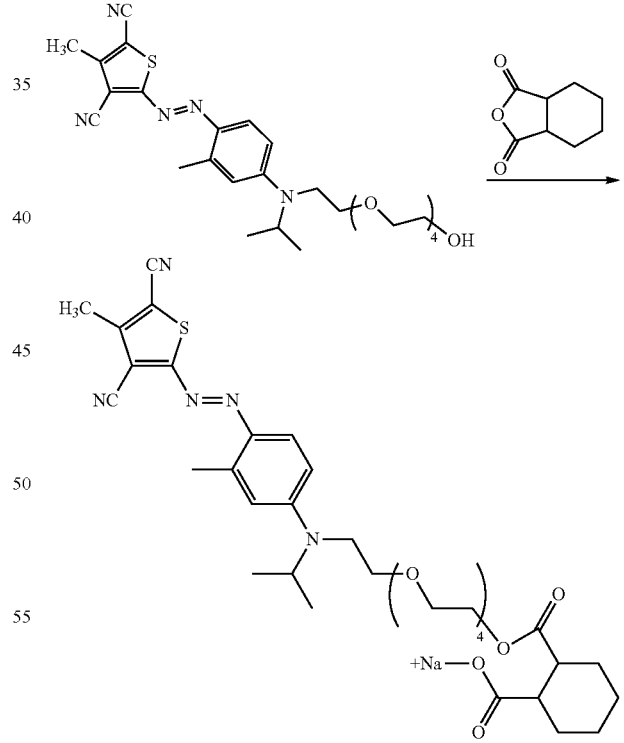

To 25 parts of the thiophene azo polymeric colorant is added 8 parts of hexahydrophthalic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 24

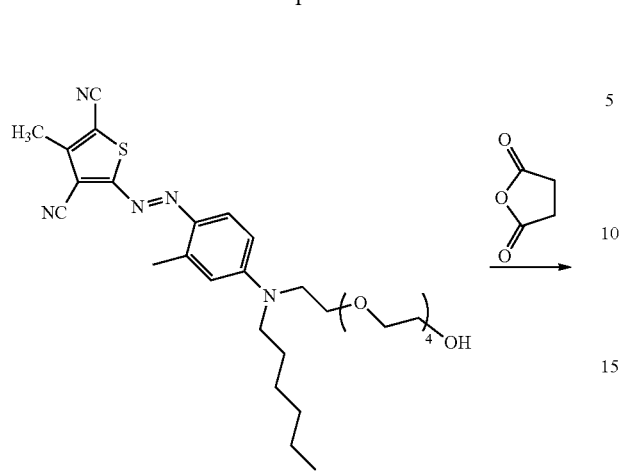

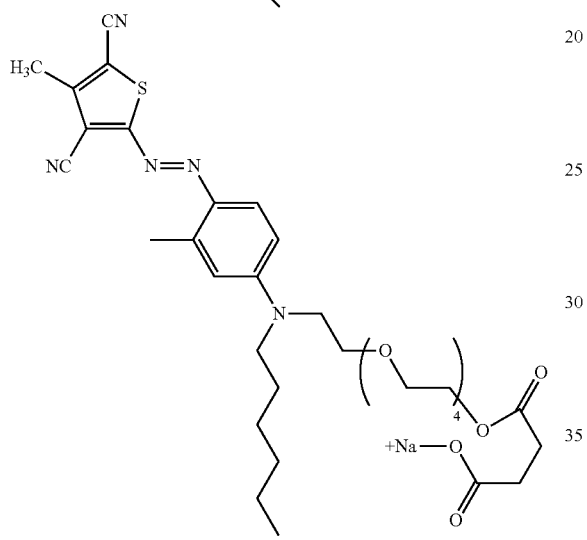

To 25 parts of the thiophene azo polymeric colorant is added 8 parts of succinic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 25

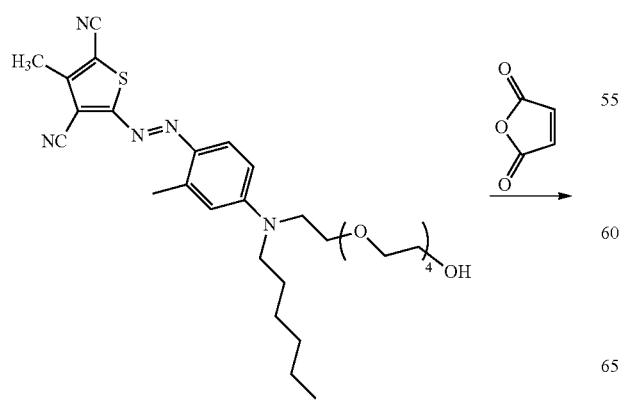

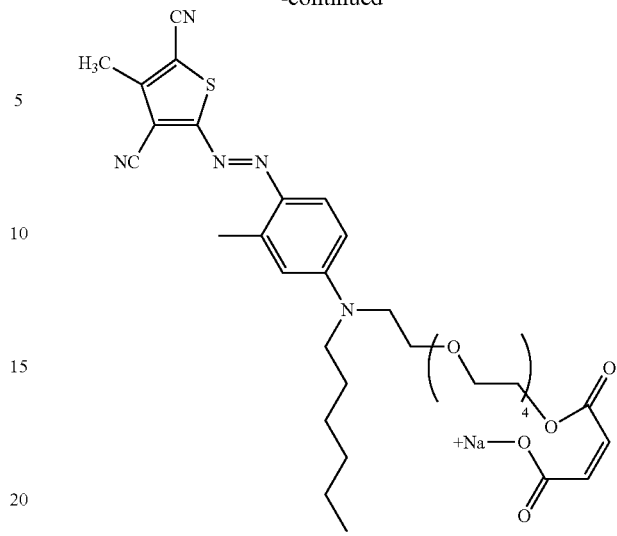

To 25 parts of the thiophene azo polymeric colorant is added 8 parts of maleic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 34

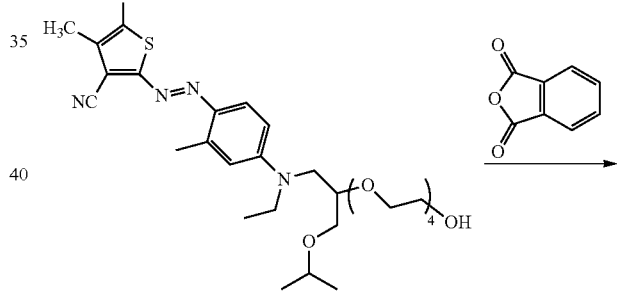

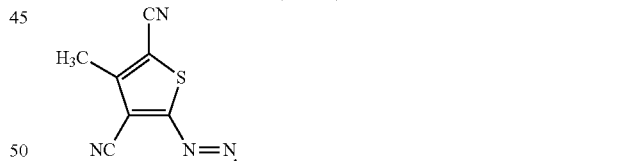

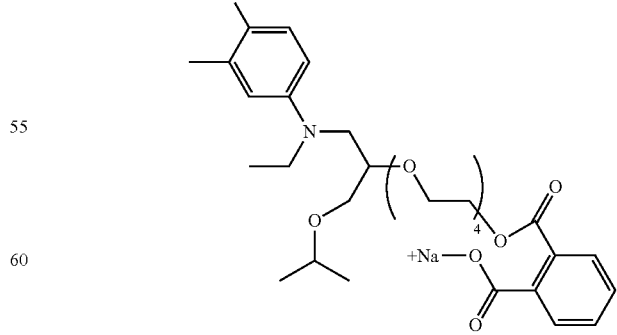

To 25 parts of the thiophene azo polymeric colorant is added 8 parts of phthalic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 44

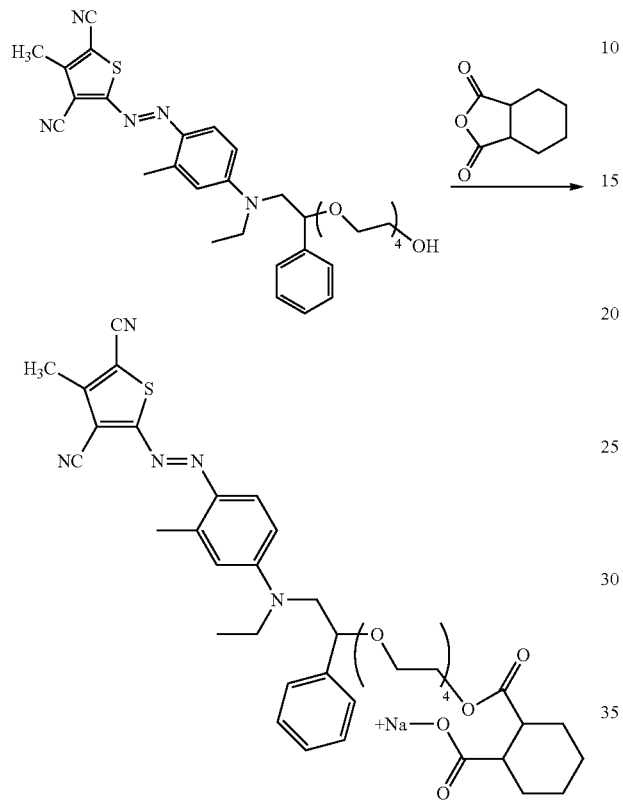

To 25 parts of the thiophene azo polymeric colorant is added 8 parts of hexahydrophthalic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

Example 45

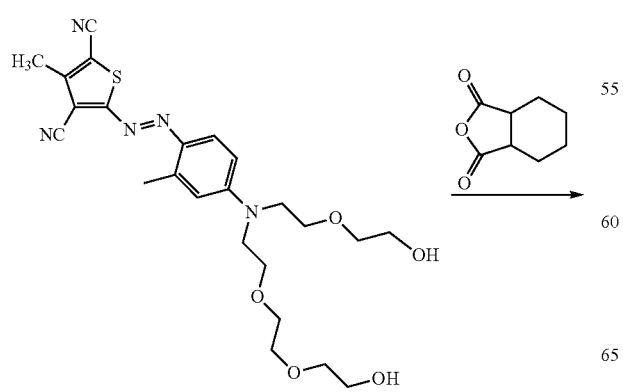

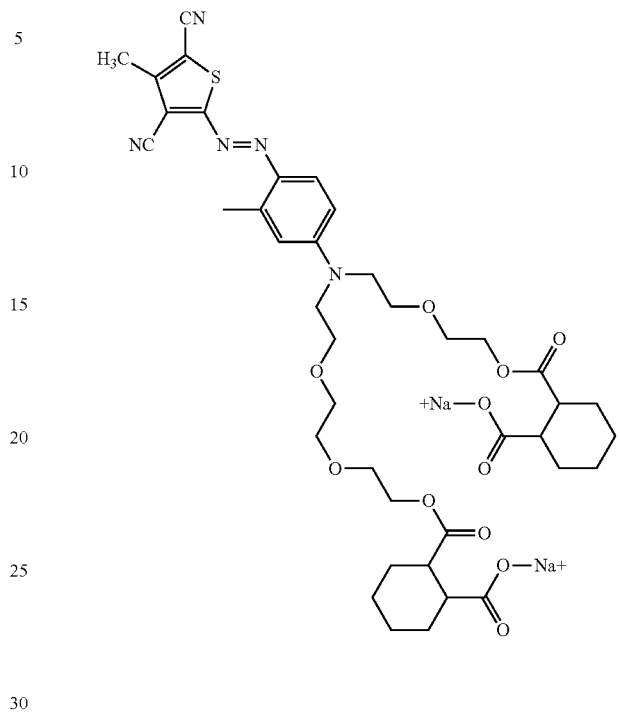

To 25 parts of the thiophene azo polymeric colorant is added 16 parts of hexahydro-phthalic anhydride. The reaction is heated to 85° C. for 12 hours and then cooled down to room temperature. The pH of the mixture is adjusted to 7 using sodium hydroxide, and the water is removed from the mixture via rotary evaporation. The desired product is obtained in quantitative conversion as assessed by HPLC.

B. Test Methods

I. Method for Determining Extinction Coefficient

A sample of 0.1000 grams of color is diluted to volume in a 100 mL volumetric flask using methanol. 2 mL of this solution are transferred to a second 100 mL volumetric flask and diluted to volume with methanol. The absorbance and lambda max of the diluted colorant are measured using a spectrophotometer in a 1 cm cell.

Lambda max is taken directly from the spectra

Extinction coefficient=((absorbance/mass used)×5)/ MW of colorant

Exemplary Detergent Formulations

Formulations 1a-1l: Liquid Detergent Formulations

Tables 7A and 7B provide examples of liquid detergent formulations which include at least one thiophene azo dye of the present invention as a hueing agent. The formulations are shown in Table 7A as Formulations 1a through 1f and in Table 7B as Formulations 1g through 1l.

TABLE 7A

Liquid Detergent Formulations Comprising the Inventive Hueing Agent

| Ingredient | 1a wt % | 1b wt % | 1c wt % | 1d wt % | 1e wt % | 1f[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 2.5% |
| amylase | 0.2% | 0.2% | 0.2% | | | 0.3% |
| lipase | | | | 0.2% | | |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Non-tinting dyes[4] | 0.0001% | 0.001% | 0.008% | 0.03% | 0.015% | 0.05% |
| Hueing Agent[6] | 0.01% | | | | 0.005% | |
| Hueing Agent[7] | | 0.01% | 0.02% | 0.003% | | 0.012% |
| water | balance | balance | balance | balance | balance | balance |
|  | 100.0% | 100.0% | 100.0% | 100.0% | 100.0% | 100.0% |

TABLE 7B

Liquid Detergent Formulations Comprising the Inventive Hueing Agent

| Ingredient | 1g wt % | 1h wt % | 1i wt % | 1j wt % | 1k wt % | 1l[5] wt % |
|---|---|---|---|---|---|---|
| sodium alkyl ether sulfate | 14.4% | 14.4% | | 9.2% | 5.4% | |
| linear lbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | 16.0% | | |
| protease | 1.0% | 1.0% | 0.7% | 1.0% | 1.7% | |
| amylase | 0.2% | 0.2% | 0.2% | 0.6% | | |
| lipase | | | | 0.2% | | 0.2% |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |

TABLE 7B-continued

Liquid Detergent Formulations Comprising the Inventive Hueing Agent

| Ingredient | 1g wt % | 1h wt % | 1i wt % | 1j wt % | 1k wt % | 1l[5] wt % |
|---|---|---|---|---|---|---|
| perfume | 0.3% | 0.3% | 0.7% | 0.3% | 0.4% | 0.6% |
| Non-tinting dyes[4] | 0.0001% | 0.001% | 0.008% | 0.03% | 0.015% | 0.05% |
| Hueing Agent[6] | 0.01% | | | | 0.005% | |
| Hueing Agent[7] | | 0.01% | 0.02% | 0.003% | | 0.012% |
| opacifier[8] | | 0.5% | | | | |
| water | balance 100.0% | balance 100.0% | balance 100.0% | balance 100.0% | balance 100.0% | balance 100.0% |

Footnotes for Formulations 1a-l:
[1] diethylenetriaminepentaacetic acid, sodium salt
[2] diethylenetriaminepentakismethylenephosphonic acid, sodium salt
[3] ethylenediaminetetraacetic acid, sodium salt
[4] a non-tinting dyes used to adjust formula color
[5] compact formula, packaged as a unitized dose in polyvinyl alcohol film
[6] thiophene azo carboxylate hueing agent from Table 6, Examples 1-21, preferably with hueing efficiency >10 and wash removability 30-85%
[7] thiophene azo carboxylate hueing agent from Table 6, Examples 22-48, preferably with hueing efficiency >10 and wash removability 30-85%
[8] Acusol OP301

Formulations 2a-2e: Granular Detergent Formulations

Table 8 provides examples of granular detergent formulations which include at least one thiophene azo carboxylate dye of the present invention as a hueing agent. The formulations are shown in Table 8 as Formulations 2a through 2e.

TABLE 8

Granular Detergent Formulations Comprising the Inventive Hueing Agent

| Ingredient | 2a wt % | 2b wt % | 2c wt % | 2d wt % | 2e wt % |
|---|---|---|---|---|---|
| Na linear alkylbenzene sulfonate | 3.4% | 3.3% | 11.0% | 3.4% | 3.3% |
| Na alkylsulfate | 4.0% | 4.1% | | 4.0% | 4.1% |
| Na alkyl sulfate (branched) | 9.4% | 9.6% | | 9.4% | 9.6% |
| alkyl ethoxylate | | | 3.5% | | |
| type A zeolite | 37.4% | 35.4% | 26.8% | 37.4% | 35.4% |
| sodium carbonate | 22.3% | 22.5% | 35.9% | 22.3% | 22.5% |
| sodium sulfate | 1.0% | | 18.8% | 1.0% | |
| sodium silicate | | | 2.2% | | |
| protease | 0.1% | 0.2% | | 0.1% | 0.2% |
| sodium polyacrylate | 1.0% | 1.2% | 0.7% | 1.0% | 1.2% |
| carboxymethylcellulose | | | 0.1% | | |
| PEG 600 | | 0.5% | | | 0.5% |
| PEG 4000 | | 2.2% | | | 2.2% |
| DTPA | 0.7% | 0.6% | | 0.7% | 0.6% |
| fluorescent whitening agent | 0.1% | 0.1% | 0.1% | 0.1% | 0.1% |
| sodium percarbonate | | 5.0% | | | 5.0% |
| sodium nonanoyloxybenzenesulfonate | | 5.3% | | | 5.3% |
| silicone suds suppressor | 0.02% | 0.02% | | 0.02% | 0.02% |
| perfume | 0.3% | 0.3% | 0.2% | 0.3% | 0.3% |
| Hueing Agent[1] | 0.004% | | | | 0.02% |
| Hueing Agent[2] | | 0.006% | 0.002% | 0.004% | |
| water and miscellaneous | balance 100.0% | balance 100.0% | balance 100.0% | balance 100.0% | balance 100.0% |

Footnotes for Formulations 2a-e:
[1] thiophene azo carboxylate hueing agent from Table 6, Examples 1-21, preferably with hueing efficiency >10 and wash removability 30-85%
[2] thiophene azo carboxylate hueing agent from Table 6, Examples 22-48, preferably with hueing efficiency >10 and wash removability 30-85%

Exemplary Fabric Care Compositions

Formulations 3a-3d: Liquid Fabric Care Compositions

Table 9 provides examples of liquid fabric care compositions which include at least one thiophene azo carboxylate dye of the present invention as a hueing agent. The compositions are shown in Table 9 as Formulations 3a through 3d.

TABLE 9

Liquid Fabric Care Compositions Comprising the Inventive Hueing Agent

| Ingredients | 3a | 3b | 3c | 3d |
|---|---|---|---|---|
| Fabric Softening Active[a] | 13.70% | 13.70% | 13.70% | 13.70% |
| Ethanol | 2.14% | 2.14% | 2.14% | 2.14% |
| Cationic Starch[b] | 2.17% | 2.17% | 2.17% | 2.17% |
| Perfume | 1.45% | 1.45% | 1.45% | 1.45% |
| Phase Stabilizing Polymer[c] | 0.21% | 0.21% | 0.21% | 0.21% |
| Calcium Chloride | 0.147% | 0.147% | 0.147% | 0.147% |
| DTPA[d] | 0.007% | 0.007% | 0.007% | 0.007% |
| Preservative[e] | 5 ppm | 5 ppm | 5 ppm | 5 ppm |
| Antifoam[f] | 0.015% | 0.015% | 0.015% | 0.015% |
| Hueing Agent[g] | 30 ppm | | | 15 ppm |
| Hueing Agent[h] | | 30 ppm | | |
| Hueing Agent[i] | | | 30 ppm | 15 ppm |
| Tinopal CBS-X[j] | 0.2 | 0.2 | 0.2 | 0.2 |
| Ethoquad C/25[k] | 0.26 | 0.26 | 0.26 | 0.26 |

TABLE 9-continued

Liquid Fabric Care Compositions
Comprising the Inventive Hueing Agent

| Ingredients | 3a | 3b | 3c | 3d |
|---|---|---|---|---|
| Ammonium Chloride | 0.1% | 0.1% | 0.1% | 0.1% |
| Hydrochloric Acid | 0.012% | 0.012% | 0.012% | 0.012% |
| Deionized Water | Balance | Balance | Balance | Balance |

Footnotes for Formulations 3a-d:
[a]N,N-di(tallowoyloxyethyl)-N,N-dimethylammonium chloride.
[b]Cationic starch based on common maize starch or potato starch, containing 25% to 95% amylose and a degree of substitution of from 0.02 to 0.09, and having a viscosity measured as Water Fluidity having a value from 50 to 84.
[c]Copolymer of ethylene oxide and terephthalate having the formula described in U.S. Pat. No. 5,574,179 at col.15, lines 1-5, wherein each X is methyl, each n is 40, u is 4, each $R^1$ is essentially 1,4- phenylene moieties, each $R^2$ is essentially ethylene, 1,2-propylene moieties, or mixtures thereof.
[d]Diethylenetriaminepentaacetic acid.
[e]KATHON ® CG available from Rohm and Haas Co.
[f]Silicone antifoam agent available from Dow Corning Corp. under the trade name DC2310.
[g]thiophene azo carboxylate hueing agent from Table 6, Examples 1-21, preferably with hueing efficiency >10 and wash removability 30-85%
[h]thiophene azo carboxylate hueing agent from Table 6, Examples 22-48, preferably with hueing efficiency >10 and wash removability 30-85%
[i]thiophene azo carboxylate hueing agent from Table 6, Examples 1-48, preferably with hueing efficiency >10 and wash removability 30-85%
[j]Disodium 4,4'-bis-(2-sulfostyryl) biphenyl, available from Ciba Specialty Chemicals.
[k]Cocomethyl ethoxylated [15] ammonium chloride, available from Akzo Nobel.

The dimensions and values disclosed herein are not to be understood as being strictly limited to the exact numerical values recited. Instead, unless otherwise specified, each such dimension is intended to mean both the recited value and functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:
1. A laundry care composition comprising:
a) a thiophene azo carboxylate dye containing a carboxylic acid moiety, with the proviso that the thiophene azo carboxylate dye does not have the following structures

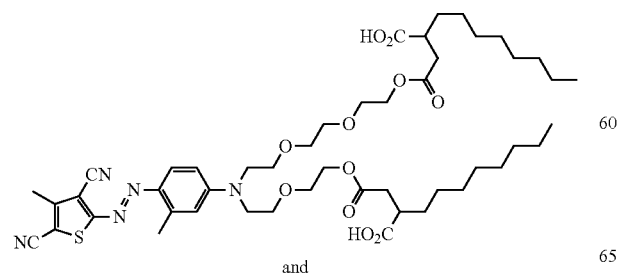

and

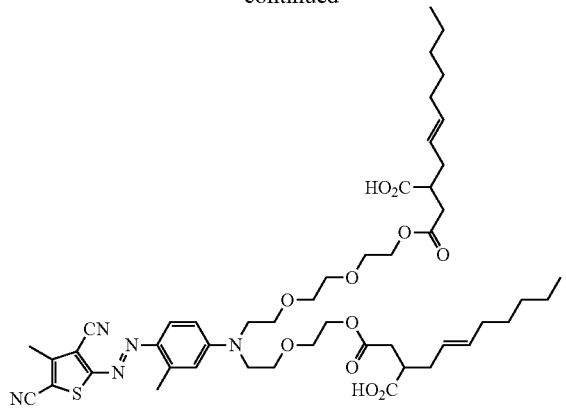

b) a laundry care ingredient wherein said thiophene azo carboxylate dye is represented by general Formula (I):

Formula I

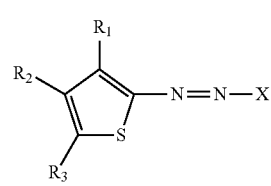

wherein:
a.) $R_1$ is an electron-withdrawing moiety, $R_2$ is an electron-donating moiety, and $R_3$ is an electron-withdrawing moiety; and
b.) wherein X is a moiety having Formula (II), Formula II

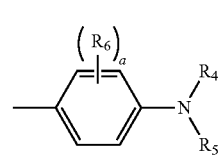

wherein, in Formula (II), $R_4$ is a moiety having Formula (V) below:

Formula V

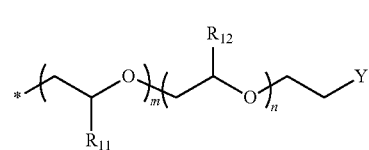

wherein each $R_{11}$ and $R_{12}$ is hydrogen; m=0 and n=4; Y is $-OC(O)GCO_2M$ wherein M is H or a charge balancing cation; G is an organic group derived from a substituted succinic anhydride having Formula VI, Formula IV

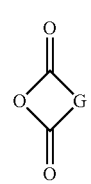

said anhydride having a molecular weight less than about 353 Daltons:

R₅ is a C₇-C₁₂ arylalkyl moiety, namely benzyl (—CH₂C₆H₅); a=1; R₆ is C₁-C₆ alkyl, namely methyl.

2. The laundry care composition of claim 1, wherein said thiophene azo carboxylate dye has, in the wavelength range of about 400 nm to about 750 nm in methanol solution, a maximum extinction coefficient greater than about 1000 liter/mol/cm.

3. The laundry care composition of claim 2, wherein said thiophene azo carboxylate dye has, in the wavelength range of about 540 nm to about 630 nm, a maximum extinction coefficient from about 20,000 to about 100,000 liter/mol/cm.

4. The laundry care composition of claim 3, wherein said thiophene azo carboxylate dye has, in the wavelength range of about 560 nm to about 610 nm, a maximum extinction coefficient from about 20,000 to about 65,000 liter/mol/cm.

5. The laundry care composition of claim 1, wherein said thiophene azo carboxylate dye has a molecular weight from greater than 232 Daltons, from about 233 Daltons to about 5000 Daltons, from about 365 Daltons to about 2500 Daltons, or even from about 423 Daltons to about 1000 Daltons.

6. The laundry care composition of claim 1, wherein for said thiophene azo carboxylate dye R₁ is a cyano, R₂ is a (C₁-C₄)-alkyl, and R₃ is a cyano.

7. The laundry care composition of claim 1, wherein for said thiophene azo carboxylate dye X is a moiety having Formula (II) below:

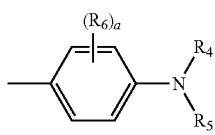

Formula II wherein:
i.);
R₄ is selected from a moiety having Formula (V) below:

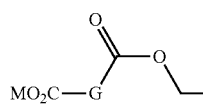

Formula V wherein
each R₁₁ and R₁₂ is hydrogen; m is 0 and n=4, Y is —OC(O)GCO₂M wherein M is H or a charge balancing cation; G is an organic group derived from a substituted succinic anhydride having Formula VI,

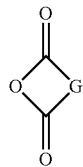

Formula VI said anhydride having a molecular weight less than about 353 Daltons;

ii.) R₅ is a C₇-C₁₂ arylalkyl moiety, namely benzyl (—CH₂C₆H₅);

ii.) a=1; and each R₆ is methyl.

8. The laundry care composition of claim 7, wherein for said thiophene azo carboxylate dye R₁ is a cyano, R₂ is a (C₁-C₄)-alkyl, namely methyl, and R₃ is a cyano.

9. The laundry care composition of claim 1 wherein said thiophene azo carboxylate dye has Formula (X):

A-N=N—X                                Formula X wherein the A moiety is

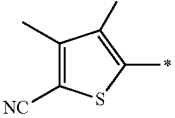

and wherein X is

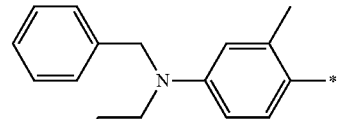

wherein G is an organic group derived from a substituted succinic anhydride having Formula XI

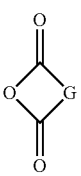

Formula XI said anhydride having a molecular weight less than about 353 Daltons.

10. The laundry care composition of claim 1 wherein said thiophene azo carboxylate dye has Formula (XII):

A-N=N—X                                Formula XII wherein the A moiety is

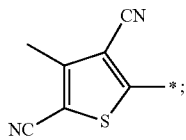

and wherein the X moiety is

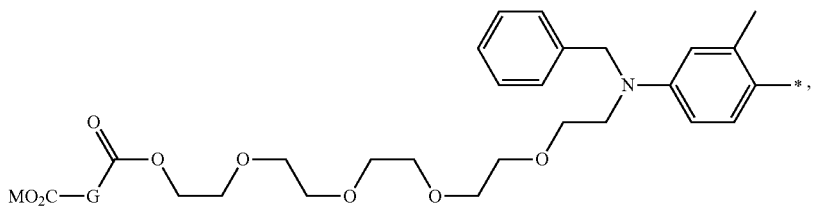

wherein G is an organic group derived from a substituted succinic anhydride having Formula XIII,

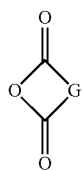

Formula XIII said anhydride having a molecular weight less than about 353 Daltons.

11. The laundry care composition of claim 10 wherein said G moiety of said thiophene azo carboxylate dye is

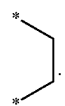

12. The laundry care composition of claim 1, wherein said thiophene azo carboxylate dye has the following formula:

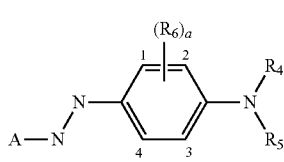

wherein the moiety A is

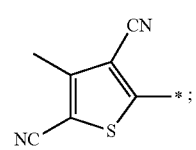

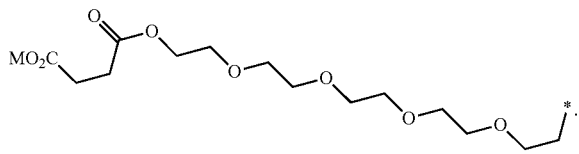

$a=1$, $R_6$ is and a methyl in the 4 position; and $R_4$ is benzyl and $R_5$ is

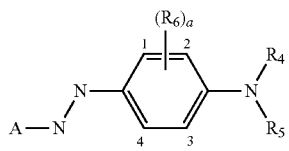

13. The laundry care composition of claim 1, wherein said thiophene azo carboxylate dye has the following formula:

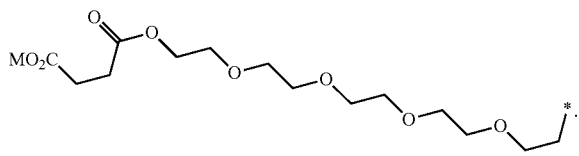

wherein the moiety A is

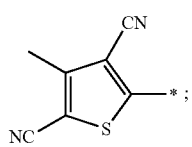

$a=1$, $R_6$ is a methyl in the 4 position; and $R_4$ is benzyl and $R_5$ is

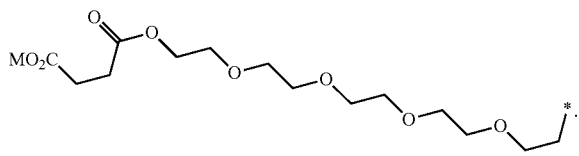

14. The laundry care composition of claim 1, wherein said thiophene azo carboxylate dye has a formula

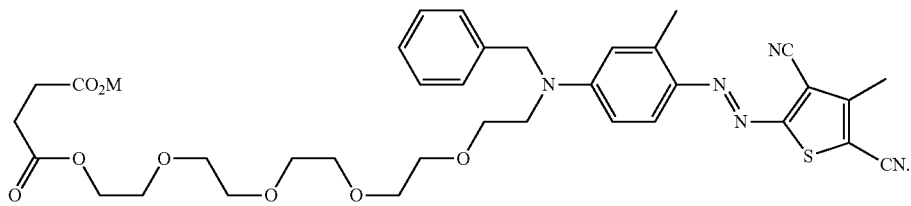

15. The laundry care composition of claim 1, said laundry care composition comprising, based on total laundry care composition weight, less than 15% builder, less than 10% builder, or even less than 5% builder.

16. The laundry care composition of claim 1, said laundry care composition being a multi-compartment unit dose product.

17. The laundry care composition of claim 1, said laundry care composition comprising, based on total laundry care composition weight, a total of no more than 20% water; a total of no more than 15% water; a total of no more than 10% water; or even a total of no more than 5% water.

18. The laundry care composition of claim 1, said laundry care composition comprising, based on total laundry care composition weight, from about 10% to about 70% of a water-miscible organic solvent having a molecular weight of greater than 70 Daltons.

19. The laundry care composition of claim 1, said laundry care composition comprising, based on total laundry care composition weight, a perfume microcapsule comprising a core and a shell that encapsulates said core, said perfume microcapsule having a D[4,3] average particle of from about 0.01 microns to about 200 microns.

20. A method of treating and/or cleaning a surface or fabric comprising the steps of optionally washing and/or rinsing said surface or fabric, contacting said surface or fabric with a laundry care composition of any of claim 1, then optionally washing and/or rinsing said surface and/or fabric then optionally letting said surface or fabric to dry and/or actively drying said surface or fabric.

* * * * *